United States Patent
Nagata et al.

(10) Patent No.: US 9,756,555 B2
(45) Date of Patent: Sep. 5, 2017

(54) USER APPARATUS, BASE STATION, DISCOVERY RESOURCE SELECTION METHOD, AND CONTROL SIGNAL TRANSMISSION METHOD

(71) Applicant: NTT DOCOMO, INC., Tokyo (JP)

(72) Inventors: Satoshi Nagata, Tokyo (JP); Katsutoshi Kusume, Munich (DE); Liang Hu, Munich (DE); Hidekazu Taoka, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 42 days.

(21) Appl. No.: 14/888,518

(22) PCT Filed: May 1, 2014

(86) PCT No.: PCT/JP2014/062100
§ 371 (c)(1),
(2) Date: Nov. 2, 2015

(87) PCT Pub. No.: WO2014/178430
PCT Pub. Date: Nov. 6, 2014

(65) Prior Publication Data
US 2016/0057693 A1 Feb. 25, 2016

(30) Foreign Application Priority Data
May 2, 2013 (JP) .................................. 2013-097184

(51) Int. Cl.
*H04W 48/14* (2009.01)
*H04W 8/00* (2009.01)
*H04W 92/18* (2009.01)

(52) U.S. Cl.
CPC ........... *H04W 48/14* (2013.01); *H04W 8/005* (2013.01); *H04W 92/18* (2013.01)

(58) Field of Classification Search
CPC ...... H04W 48/14; H04W 8/005; H04W 92/14
See application file for complete search history.

(56) References Cited

U.S. PATENT DOCUMENTS

2015/0215977 A1* 7/2015 Yamazaki ............... H04W 4/08
455/452.1
2015/0319742 A1* 11/2015 Koivisto ........... H04W 72/0406
370/329
(Continued)

FOREIGN PATENT DOCUMENTS

JP      2012-209893 A    10/2012
WO      2014169695 A1    10/2014

OTHER PUBLICATIONS

ZTE, "Evaluation methodology for LTE Device to Device proximity services", Apr. 15-19, 2013, 3GPP TSG RAN WG1 Meeting #72bis, R1-131045, pp. 1-7.*
(Continued)

Primary Examiner — Paul H Masur
(74) Attorney, Agent, or Firm — Osha Liang LLP

(57) ABSTRACT

A user apparatus configured to perform transmission of a discovery signal by radio, including: means that determines a resource group pattern to be used by the user apparatus based on information transmitted from a base station, and determines a resource group including one discovery resource or a plurality of discovery resources that can be used for transmitting the discovery signal from among one resource group or a plurality of resource groups included in the resource group pattern; and means that selects a discovery resource to be used for transmitting the discovery signal from among the determined resource group.

15 Claims, 28 Drawing Sheets

(56) References Cited

U.S. PATENT DOCUMENTS

2016/0014589 A1* 1/2016 Niu ................. H04W 74/02
370/329
2016/0057604 A1* 2/2016 Luo ................. H04W 8/005
370/330

OTHER PUBLICATIONS

Extended European Search Report issued in the counterpart European Patent Application No. 14791238.0, mailed Mar. 31, 2016 (10 pages).
International Search Report issued in corresponding application No. PCT/JP2014/062100 mailed Jul. 22, 2014 (2 pages).
Written Opinion issued in corresponding application No. PCT/JP2014/062100 dated Jul. 22, 2014 (3 pages).
Office Action issued in the counterpart Japanese Patent Application No. 2013-097184, mailed Mar. 14, 2017 (6 pages).

* cited by examiner

HP EXAMPLE:

HP1: {1, 2, 3, ⋯                    ⋯, 16}
HP2: {2, 4, 6, ⋯, 16, 1, 3, 5, ⋯, 15}
⋯
HPx: {1, 3, 5, 7} ← subset of RGs
⋯

HP EXAMPLE:

HP1: {1, 2, 3, 4}
HP2: {2, 4, 1, 3}
HP3: {4, 3, 2, 1}
...

HP EXAMPLE:

HP1: {1, 2, ···, 8} ← deterministic only
HP2: {8, 7, ···, 1} ← deterministic only
HP3: {9} ← distributed only
HP4: {1, 2, 9} ← mixed
...

{RG9} (distributed)
→ {RG1, RG2, ···, RG8} (deterministic)

(a)          (b)

means that selects a discovery resource to be used for transmitting the discovery signal from among the determined resource group.

According to an embodiment of the present invention, there is provided a base station configured to transmit a control signal to a user apparatus that performs transmission of a discovery signal by radio, including:

means that transmits, to the user apparatus, a control signal including information indicating a resource group pattern;

means that transmits, to the user apparatus, information to be used for determining a resource group that includes one discovery resource or a plurality of discovery resources that can be used for transmitting the discovery signal from among one resource group or a plurality of resource groups included in the resource group pattern.

Effect of the Present Invention

According to an embodiment of the present invention, a technique is provided for enabling selection of a discovery resource by a scheme in which both of the centralized type and the distributed type coexist in terminal-to-terminal communication.

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below.

Basic Example

Figure 1:
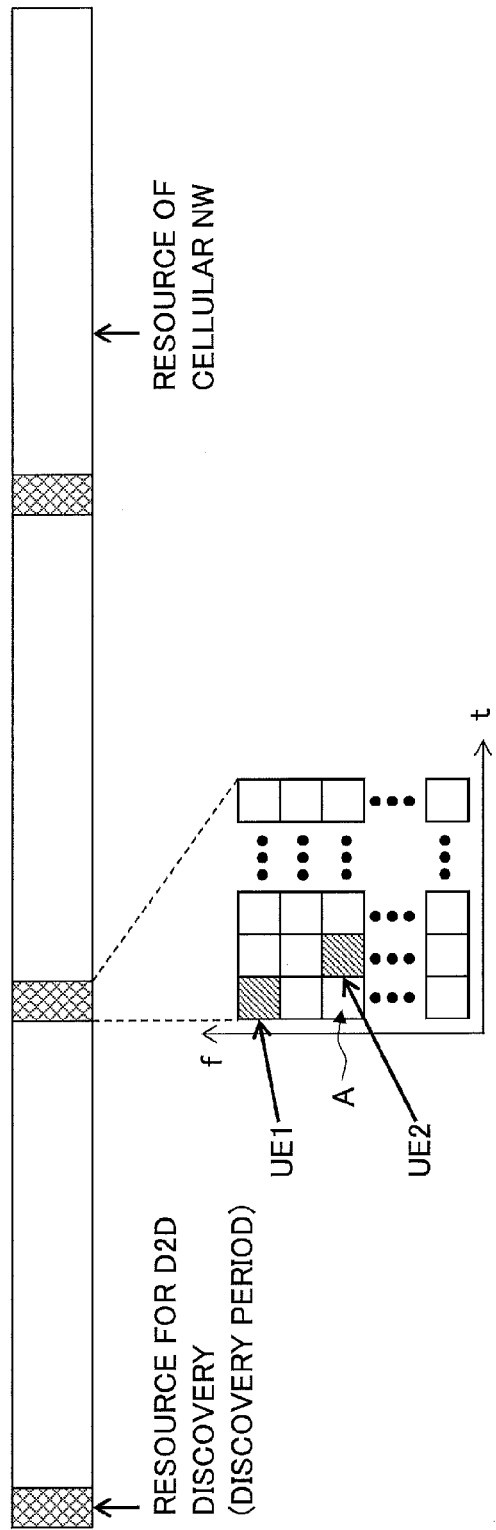
FIG. 1 is a diagram showing an example of a resource for transmitting a discovery signal.
Figure 2:
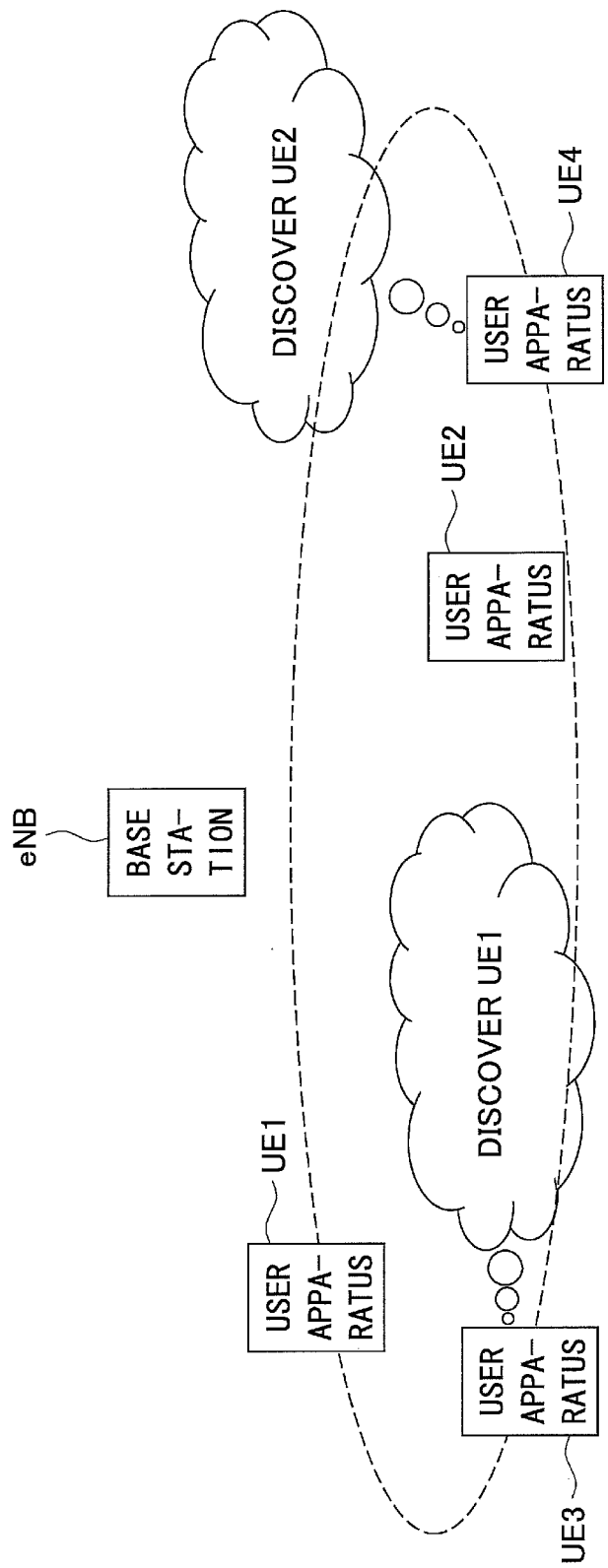
FIG. 2 is a diagram for explaining D2D communication.
Figure 3:
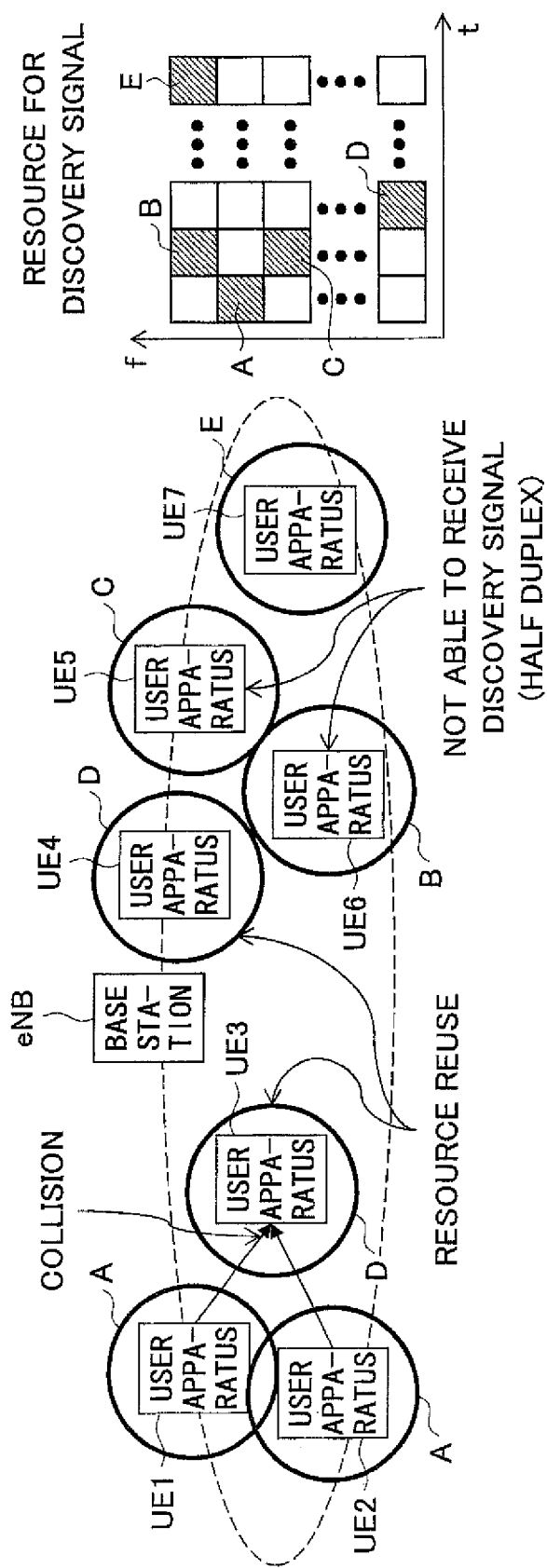
FIG. 3 is a diagram showing an example of transmission and reception of a discovery signal.
Figure 4:
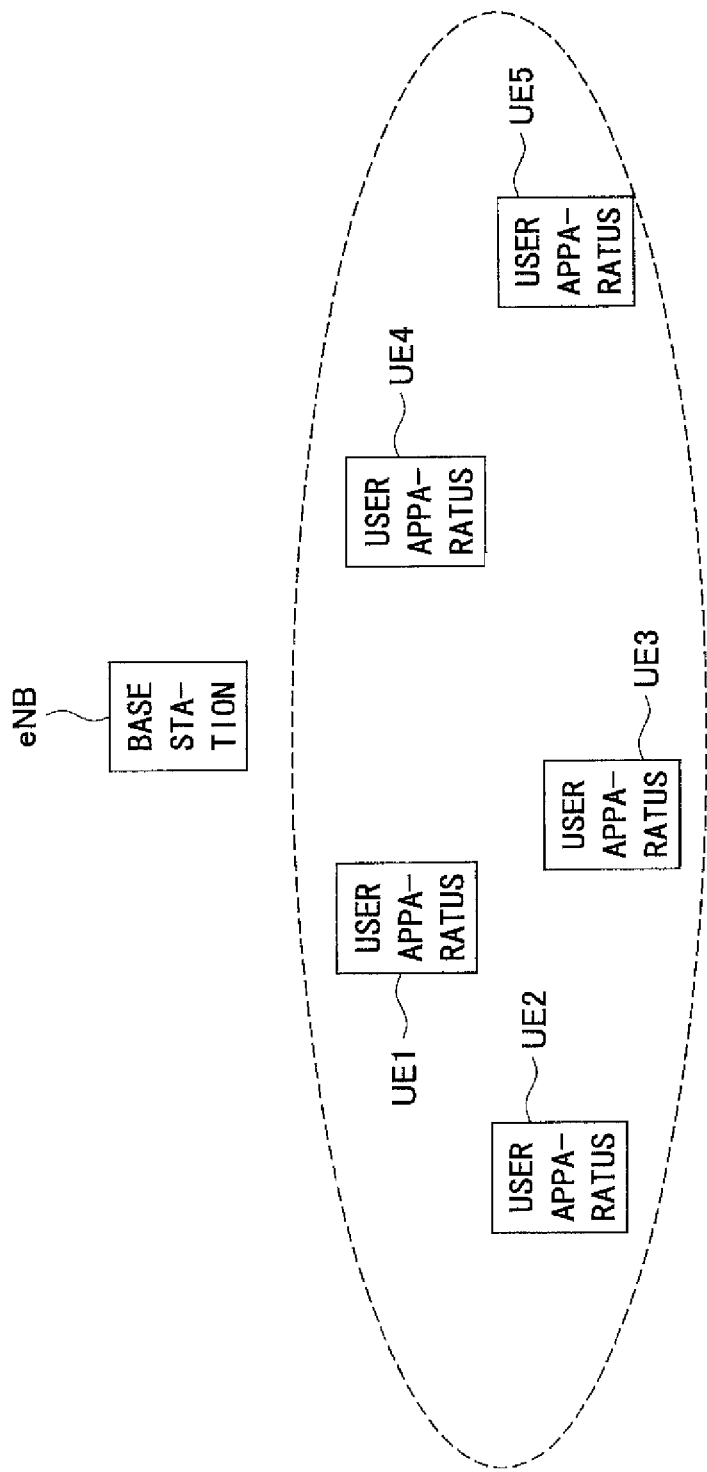
FIG. 4 is a diagram showing a configuration example of a communication system in an embodiment of the present invention.
Figure 5:
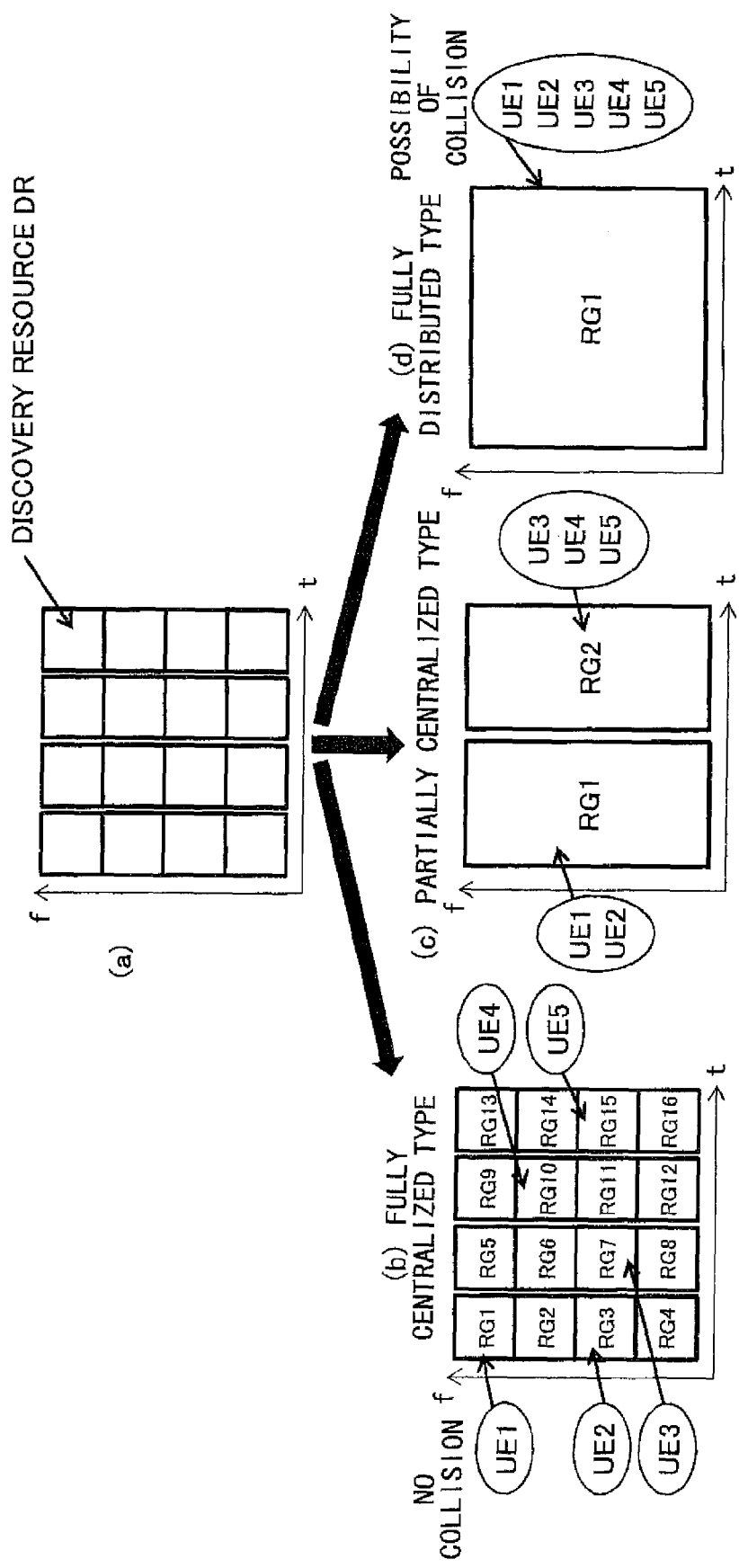
FIG. 5 is a diagram for explaining a basic example.

First, with reference to FIG. 4 and FIG. 5, a basic example in an embodiment of the present invention is described. FIG. 4 shows a configuration example of a communication system in the present embodiment. As shown in FIG. 4, the communication system of the present embodiment is a cellular communication system in which a plurality of user apparatuses DE exist under the base station eNB. The cellular communication system complies with LTE, for example. However, the system is not limited to LTE. In the specification and the claims, the term "LTE" is used to mean not only a communication scheme corresponding to 3GPP, release 8 or 9, but also a communication scheme corresponding to 3GPP release 10, 11, 12 or later release.

FIG. 5 is a diagram for explaining resources on discovery resources of the present embodiment. In the present embodiment, as an example for making the explanation easy to understand, as shown in FIG. 5(a), it is assumed that 4×4=16 discovery resources (DR: discovery resource) are usable in one discovery signal transmission occasion (discovery period). For the sake of convenience, the region usable as the discovery resources DR is referred to as, a discovery resource whole region. One discovery resource DR is a minimum unit of resource used by a user apparatus for transmitting a discovery signal. For example, the discovery resource DR consists of a plurality of RBs (resource blocks) defined in LTE.

In the present embodiment, a plurality of resource group (RG: Resource Group) patterns are introduced. One RG pattern includes one resource group or a plurality of resource groups RGs. One resource group RG includes one discovery resource DR or a plurality of discovery resources DRs. The user apparatus UE is assigned a RG pattern and a resource group RG that should be used in the RG pattern. This assignment is performed by a signaling from the base station eNB, for example. Also, there is a case in which assignment of a resource group RG is performed as an assignment of a hopping pattern of a resource group RG, as described later.

Then, the user apparatus UE arbitrarily (randomly, for example) selects one discovery resource DR from among one or a plurality of discovery resources DR in the assigned resource group RG so as to use it for transmitting a discovery signal. In a case where the resource group RG includes only one discovery resource DR, assignment of a resource group RG becomes assignment of a discovery resource DR as it is.

FIG. 5 shows three RG patterns as an example. The RG pattern shown in FIG. 5(b) is a pattern in which each of the resource groups RGs which form the RG pattern is one discovery resource DR. As mentioned above, this pattern corresponds to a case where each resource group RG includes only one discovery resource DR, and assignment of resource group RG becomes assignment of discovery resource DR as it is. As an example, FIG. 5(b) shows an assignment example of user apparatuses UE1-UE5 shown in FIG. 4. In the case of this pattern, assignment becomes the same as that of the before-mentioned centralized type as a result. Thus, this pattern can be called a fully centralized type.

The RG pattern shown in FIG. 5(c) is a pattern in which the discovery resource whole region is divided into two resource groups (RG1 and RG2). As shown in FIG. 5(c), user apparatuses UE1 and UE2 are assigned to RG1, and user apparatuses UE3, UE4 and UE5 are assigned to RG2. In the case of assignment shown in FIG. 5(c), for example, as to the user apparatus UE1, the RG pattern shown in FIG. 5(c) is assigned, and further, RG1 in the RG pattern is assigned.

As for the RG pattern shown in FIG. 5(c), each user apparatus UE to which RG1 is assigned arbitrarily selects a discovery resource DR in the RG1. Thus, there is a possibility in that collision of discovery signals and deafness may occur between user apparatuses UE to which RG1 is assigned. This also applies to user apparatuses to which RG2 is assigned. The RG pattern shown in FIG. 5(c) is the centralized type in a point that one RG is assigned to a user apparatus UE from among a plurality of RGs, and the RG pattern shown in FIG. 5(c) is also the distributed type in a point that the user apparatus UE arbitrarily selects one discovery resource DR from among a plurality of discovery resources DR included in the RG. Thus, such a RG pattern can be called as a partially distributed type.

The RG pattern shown in FIG. 5(d) is a pattern in which only one resource group RG (RG1) is included in the RG pattern. In this case, 16 discovery resources DR shown in FIG. 5(a) are included in RG1, and each user apparatus UE selects one discovery resource DR from among 16 discovery resources DR to transmit a discovery signal. In this pattern, assignment becomes the same as that of the distributed type as a result. Thus, this pattern can be called a fully distributed type.

<Other Examples of RG Patterns>

Figure 6:
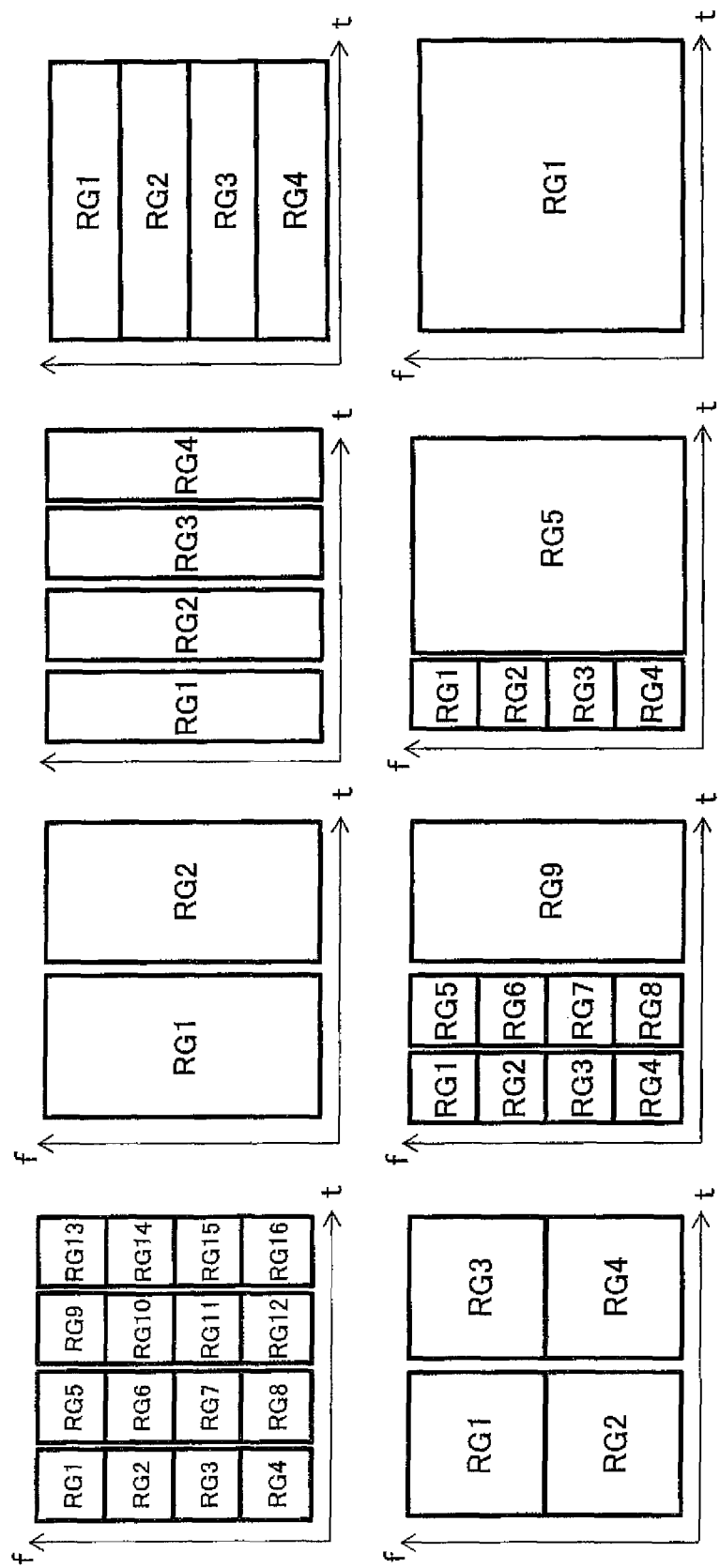
FIG. 6 is a diagram for explaining examples of RG patterns.

In the present embodiment, RG patterns are not limited to the above-mentioned particular patterns, and any RG pattern can be introduced. Examples of a plurality of RG patterns including the examples of RG patterns shown in FIG. 5 are shown in FIG. 6.

In the following, as concrete examples based on the above-mentioned basic example, example 1-example 3 are described.

Example 1: Introduction of Hopping Pattern

In the example 1, a hopping pattern between RGs is introduced in a RG pattern including a plurality of RGs. Further, a hopping pattern between DRs is introduced in a RG including a plurality of discovery resources DR. In the communication system of the present embodiment, both of the hopping pattern between RGs in the RG pattern including a plurality of RGs and the hopping pattern between DRs in RG including a plurality of discovery resources DR may be used, or either one of the hopping patterns may be used.

Figure 7:
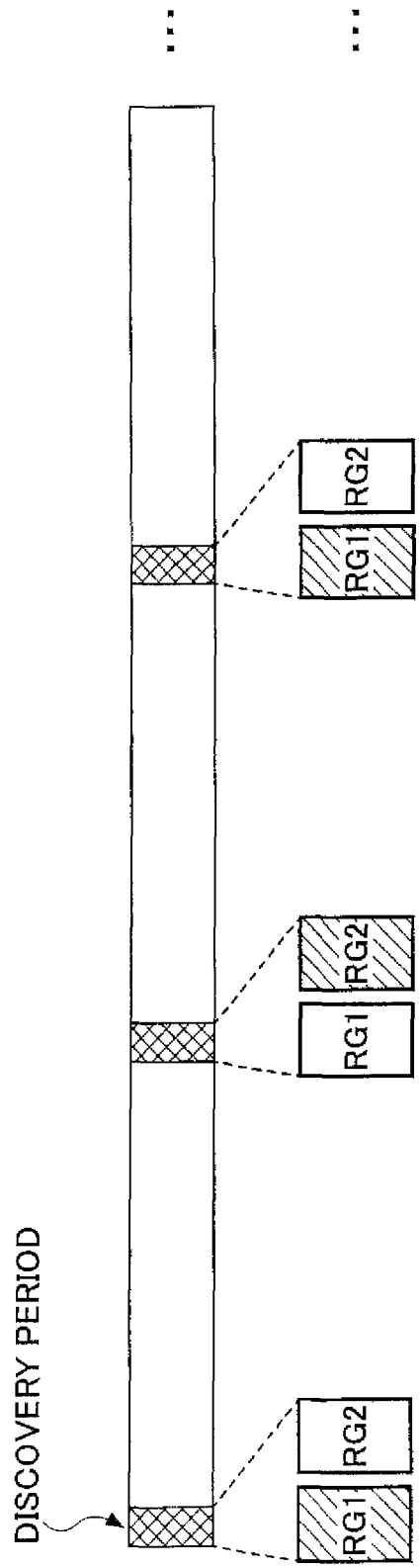
FIG. 7 is a diagram for explaining hopping between RGs.

Hopping between RGs is that, as shown in FIG. 7, for example, a user apparatus UE to which a RG pattern (showing an example of the pattern of FIG. 5(c) in FIG. 7) is assigned changes a RG to be used in the RG pattern, for each discovery period that is a transmission occasion, according to a rule defined by the hopping pattern. Depending on the hopping pattern, there is a case in which the user apparatus UE changes the RG every multiple discovery periods instead of every discovery period.

Figure 8:
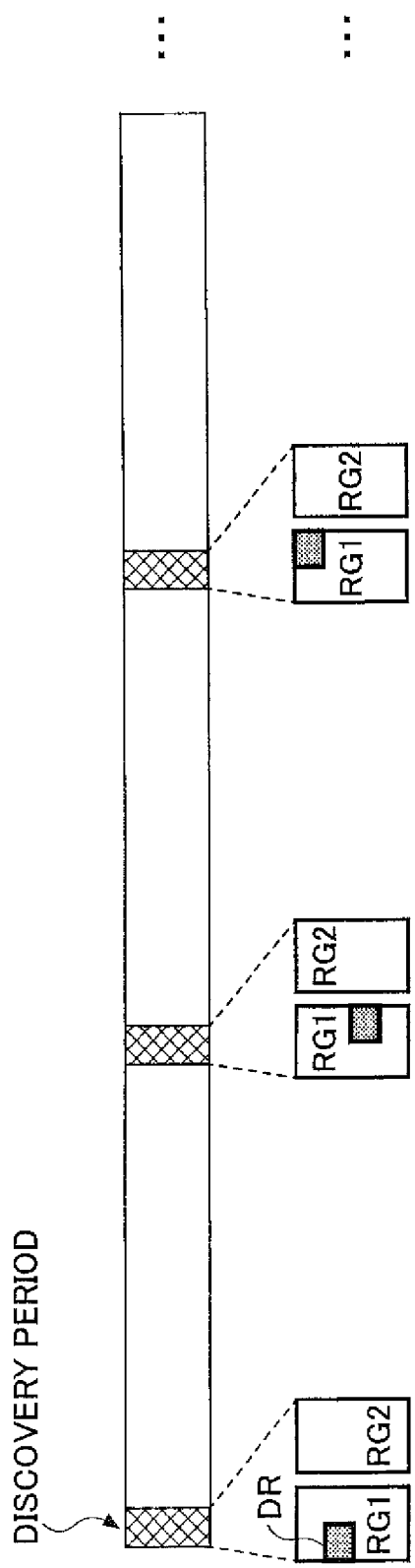
FIG. 8 is a diagram for explaining DR hopping in a RG.

Hopping between DRs is that, as shown in FIG. 8, for example, a user apparatus UE to which a RG (showing RG1 in an example of the pattern of FIG. 5(c) in FIG. 8) of a RG pattern is assigned changes a DR to be used, for each discovery period that is a transmission occasion, according to a rule defined in the hopping pattern. Depending on the hopping pattern, there is a case in which the user apparatus UE changes the DR every multiple discovery periods instead of every discovery period. Also, although FIG. 8 shows a case where only hopping between DRs is performed without performing hopping between RGs in order to show hopping between DRs simply, it is possible to perform hopping between DRs in addition to hopping between RGs.

Effects on applying a hopping pattern in the fully centralized type, partially centralized type and fully distributed type are described with reference to FIGS. 9(a), (b) and (c) which are similar to FIGS. 5(a), (b) and (c).

Figure 9:
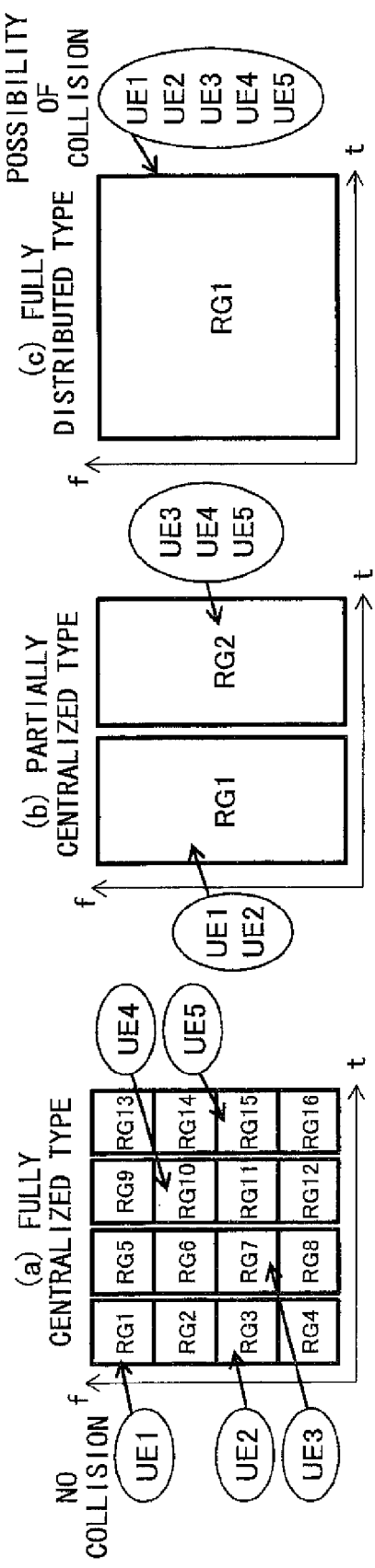
FIG. 9 is a diagram for explaining effects on applying hopping pattern.

In the case of the fully centralized type RG pattern in which user apparatuses UE1-UE5 are assigned as shown in FIG. 9(a), since the same time resource is assigned for the user apparatuses UE1 and UE2, each of them cannot receive a discovery signal of the other party. Thus, by performing inter-RG-hopping, especially, by performing time domain inter-RG-hopping, it becomes possible that the time resource assigned to the user apparatus UE1 is different from the time resource assigned to the user apparatus UE2. Thus, the problem of unavailability of discovery signal reception is solved.

Also, since the discovery signal is transmitted by one-to-multiple broadcasting, there may be a case where a user apparatus UE of receiving side of a discovery signal is affected by large fading effect for a DR (=RG in the fully centralized type) used in a user apparatus UE in the transmitting side. In such a case, the user apparatus UE in the receiving side cannot properly receive the discovery signal transmitted by the DR, so that the user apparatus UE cannot discover the user apparatus UE in the transmission side. So, by performing inter-RG-hopping, especially, by performing inter-RG-hopping in the frequency domain, frequency of DR can be changed every discovery period, for example, so that it becomes possible to increase the possibility in which a DR by which the user apparatus UE in the receiving side, affected by the fading effect in a particular DR, can properly receive a discovery signal is selected.

In the case of the example of the partially centralized type shown in FIG. 9(b), there is a possibility in that collision of discovery signals and unavailability (deafness) of discovery signal reception may occur between a plurality of user apparatuses UE to which the same RG is assigned such as user apparatuses UE1 and UE2 to which RG1 is assigned and the user apparatuses UE3, UE4 and UE5 to which RG2 is assigned. So, by introducing inter-RG-hopping, even though a plurality of user apparatuses UE use the same RG in a discovery period, the possibility becomes high in which the plurality of user apparatuses UE use a different RG in another discovery period, so that it becomes possible to reduce possibility of occurrence of collision of discovery signals and unavailability of discovery signal reception (deafness). Also, by introducing inter-DR-hopping, it becomes possible to increase the possibility that a plurality of user apparatuses UE use different DRs in the time domain and in the frequency domain even when the plurality of user apparatuses UE use the same RG, so that it becomes possible to reduce the possibility of occurrence of collision of discovery signals and unavailability of discovery signal reception (deafness).

In the case of the example of the fully distributed type shown in FIG. 9(c), there is a possibility of occurrence of collision of discovery signals and unavailability of discovery signal reception between a plurality of user apparatuses UE like the status in RG1 and the status in RG2 in FIG. 9(b). So, by introducing inter-DR-hopping, it becomes possible to increase the possibility that a plurality of user apparatuses UE use different DRs in the time domain and in the frequency domain, so that it becomes possible to reduce the possibility of occurrence of collision of discovery signals and unavailability of discovery signal reception (deafness).

The RG hopping pattern and/or DR hopping pattern to cause the above-mentioned effects is dynamically determined by the base station eNB, for example, and is notified to the user apparatus UE by an after-mentioned signaling.

Example 2: Signaling from the Base Station eNB to the User Apparatus UE

Example 2-1: Notification of RG Pattern

In the present embodiment, the base station eNB transmits, to user apparatuses UE, a control signal including information indicating a RG pattern by a signaling, so that the user apparatus UE that receives the control signal uses the RG pattern according to the information.

Figure 10:
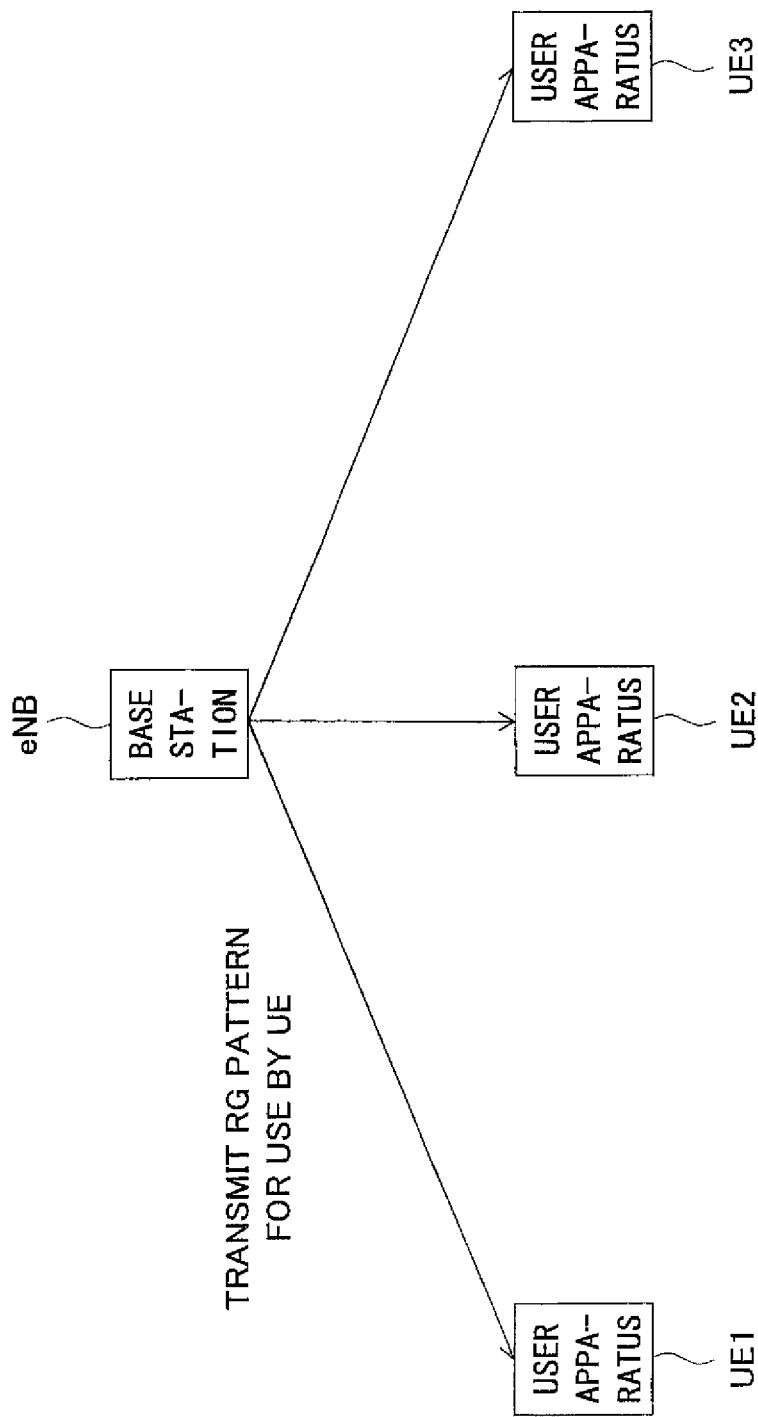
FIG. 10 is a diagram for explaining a signaling for notifying of a RG pattern.

FIG. 10 shows an example of a signaling for notifying of a RG pattern in the present embodiment. In this example, as shown in FIG. 10, the base station eNB broadcasts a control signal, to user apparatuses in the area, including information indicating a RG pattern to assign (broadcast signaling). The information indicating the RG pattern is, for example, an index that is predetermined as information identifying a particular RG pattern. Or, information indicating RG pattern itself may be reported. The information indicating the RG pattern itself is represented by an information format in which resource positions of discovery resources in the discovery resource whole region are associated with resource group identification information, for example.

Figure 11:
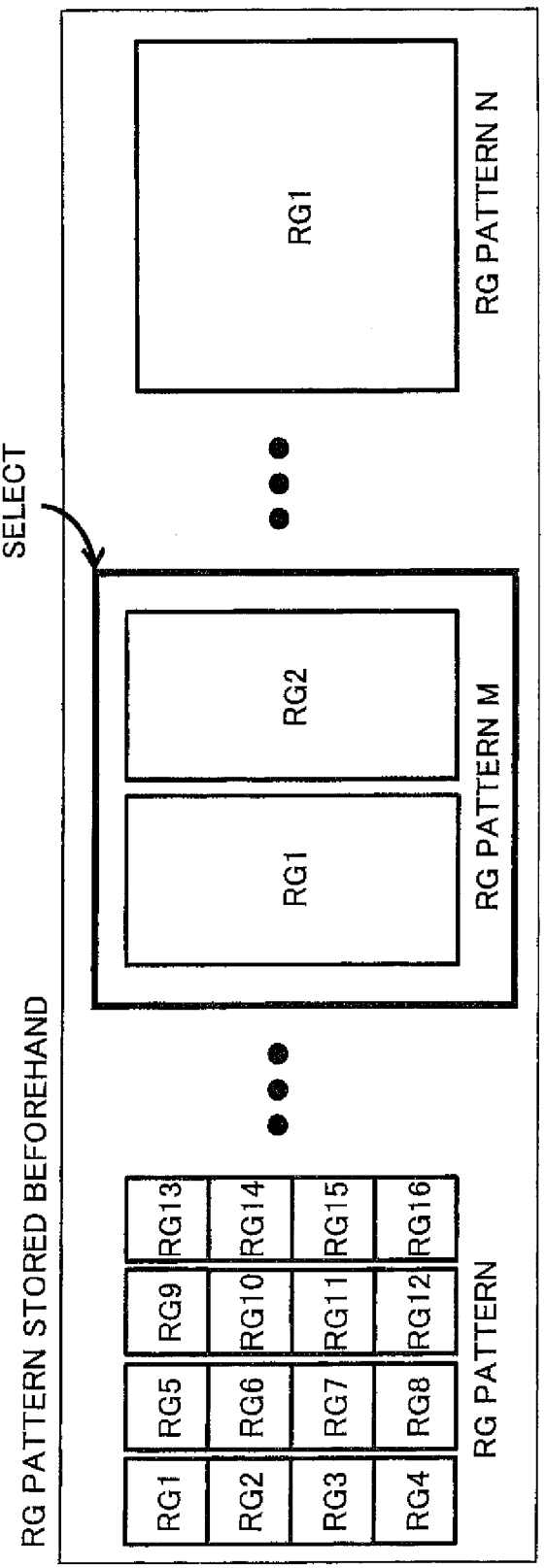
FIG. 11 is a diagram for explaining an operation example of a user apparatus UE that receives a control signal.

An operation example of each user apparatus UE that receives the control signal is described with reference to FIG. 11. In the example shown in FIG. 11, each user apparatus UE stores a plurality of RG patterns in a storage unit. Then, each user apparatus UE selects a RG pattern corresponding to information (index), included in the control signal received from the base station eNB, indicating the RG pattern so as to use the RG pattern for selecting a resource for transmitting a discovery signal. FIG. 11 shows a situation in which a user apparatus GE stores RG patterns 1-N beforehand, receives a control signal indicating a RG pattern M from the base station eNB, and selects the RG pattern M.

The control signal may be transmitted by using a signaling, already defined in LTE, such as SIB, cell specific RRC signaling and the like. Also, new signaling may be defined.

Example 2-2: Configuration of Discovery Behavior (Configuration of Discovery Behavior) for User Apparatus UE In the present embodiment, the base station eNB transmits a control signal specific (individual) to user apparatus UE (example: UE specific RRC signaling) to individual user apparatuses UE to which the RG pattern is assigned as mentioned above so as to configure the user apparatuses UE with individual discovery behavior.

As information by which the user apparatus UE is configured, the above-mentioned control signal includes, for discovery signal transmission, start subframe number, periodicity, duration, RG hopping pattern parameter (index and the like), and DR hopping pattern parameter (index and the like), for example.

The periodicity is a transmission periodicity of a discovery signal. For example, the periodicity is a periodicity in which, for example, a discovery signal is transmitted every two times of arrival of discovery period. The duration indicates a transmission duration of a discovery signal. The duration indicates, for example, a duration in which the user apparatus UE transmits a discovery signal for 10 seconds, then, stops transmission, or, the user apparatus UE transmits a discovery signal 10 times, then, stops transmission. The RG hopping pattern parameter is a parameter for indicating a method of RG hopping executed by the user apparatus UE. The DR hopping pattern parameter is a parameter for indicating a method of DR hopping executed by the user apparatus UE.

The control signal specific to user apparatus UE may include indication information, of a RG pattern, that is transmitted by a control signal common to user apparatuses, which is described with reference to FIG. 10. In this case, the control signal common to user apparatuses may not include indication information of a RG pattern.

Figure 12:
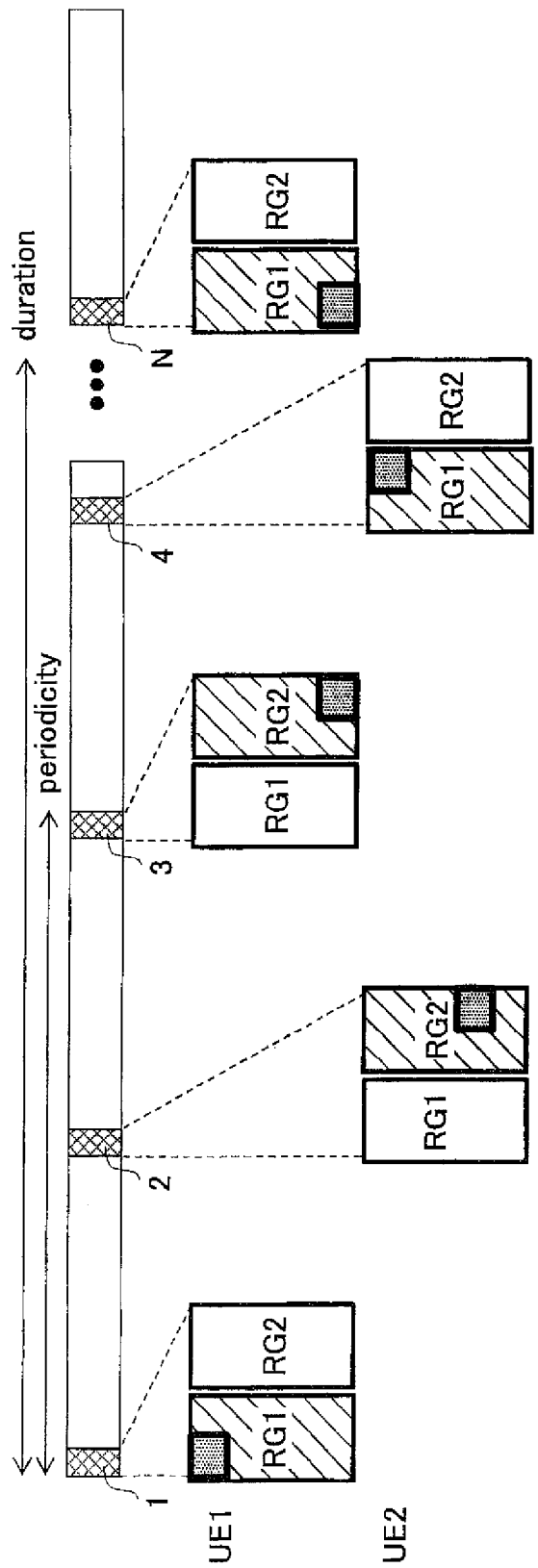
FIG. 12 is a diagram showing an operation example of user apparatuses UE1 and UE2 configured by a control signal specific to user apparatus UE.

FIG. 12 shows an operation example of user apparatuses UE1 and UE2, that receive the above-mentioned control signal, to which the configuration is set.

In the example shown in FIG. 12, each of the user apparatuses UE1 and UE2 has been assigned a RG pattern of the partially centralized type. The user apparatus UE1 receives a (UE specific) control signal specific to the user apparatus UE1 so as to perform discovery signal transmission until discovery duration N by using a RG hopping pattern in which RG1 and RG2 are alternately used every two discovery periods. Further, the user apparatus UE1 performs DR hopping in each RG. The user apparatus UE2 performs similar operation, in which start timing of discovery signal transmission is different from that of the user apparatus UE1.

In the present embodiment, although it is basic that the user apparatus UE arbitrarily selects a DR in a RG, the base station eNB may indicate, to the user apparatus US by a signaling, a selection method for selecting arbitrarily, so that DR hopping can be realized, for example. For example, by instructing the user apparatus UE to sequentially use DRs of numbers that are separated by a predetermined number, DR hopping can be realized. In this case, the selection method may be called DR hopping pattern. Also, like the RG hopping pattern, a hopping pattern indicating DR numbers may be used.

Example 2-3: Example of Hopping Pattern

Figure 13:
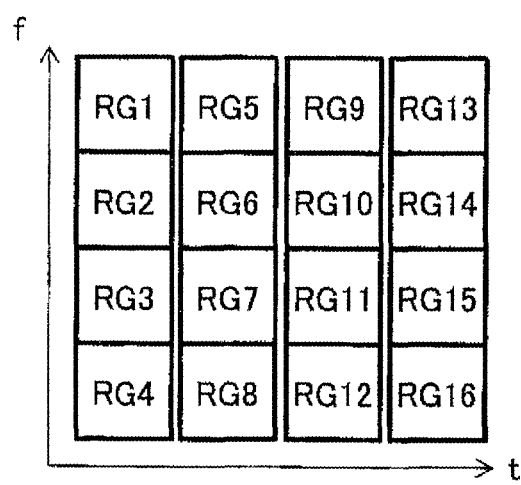
FIG. 13 is a diagram showing examples of RG hopping patterns.

Here, examples of RG hopping patterns designated by a control signal from the base station eNB are described with reference to FIGS. 13-15.

The RG hopping pattern may be a pattern over all RGs in a RC pattern, or may be a pattern over a part of RGs of all RGs of a RG pattern. In the example shown in FIG. 13, each of the indexes HP1 and HP2, indicating a RG hopping pattern, shows a pattern over all RGs in a RG pattern, and HPx indicates a pattern over a part of RGs. For example, a user apparatus UE that receives a designation of a hopping pattern of HP1 performs operation according to the hopping pattern, in which the user apparatus UE uses RG1 in a first transmission occasion of a discovery signal, uses RG2 in a next transmission occasion, and uses RG3 in a further next transmission occasion, and the like.

As to notification of a RG hopping pattern from the base station eNB to the user apparatus UE, an index may be notified, or a pattern itself may be notified. In the case of notifying of an index, a plurality of RG hopping patterns are stored in the storage unit of the user apparatus UE for each RG pattern beforehand, so that the user apparatus UE reads out a RG hopping pattern corresponding to a received index from the storage unit, and uses the RG hopping pattern.

Figure 14:
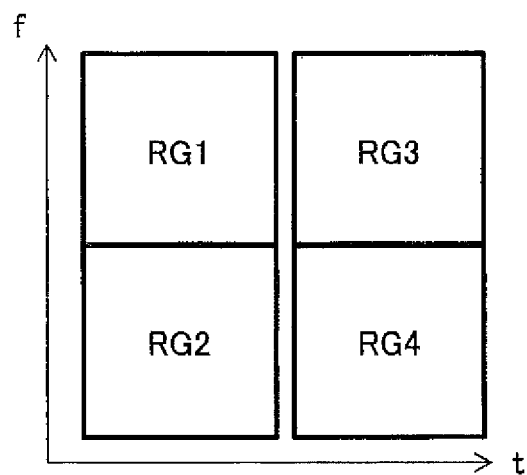
FIG. 14 is a diagram showing examples of RG hopping patterns.

FIG. 14 is an example of a RG hopping pattern in an example of the partially centralized type RG hopping pattern.

Figure 15:
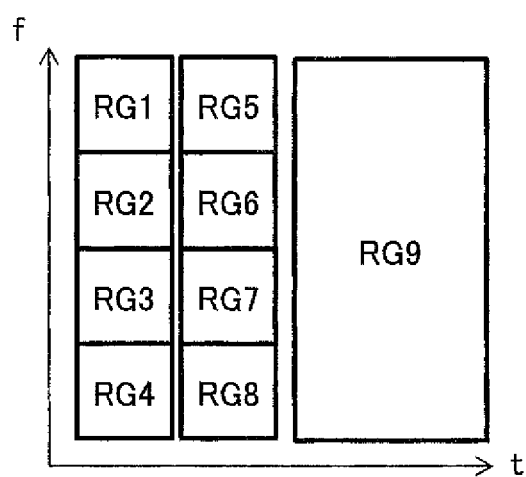
FIG. 15 is a diagram showing examples of RG hopping patterns.

FIG. 15 also shows examples of RG hopping patterns in an example of the partially centralized RG pattern. In the case of the example of FIG. 15, RG9 itself is the fully distributed type. A user apparatus UE to which HP3 is designated arbitrarily selects a DR within the RG9. Also, for example, a user apparatus UE to which HP1 is designated selects DR(=RG) as indicated by the hopping pattern. A user apparatus UE to which HP4 is designated uses RG1(=DR) in a transmission occasion of RG1, uses RG2(=DR) in a transmission occasion of RG2, and uses DR arbitrarily selected from among RG9 in a transmission occasion of RG9.

As a hopping pattern, an existing hoping pattern defined in LTE and the like may be used. As such a hopping pattern, for example, there are FH pattern in PUSCH transmission, and QPP interleaver in Turbo coding, and the like. Also, a hopping pattern may be defined by an equation including modulo calculation and the parameters, for the equation.

Example 2-4: Other Examples of Signaling from the Base Station eNB to the User Apparatus UE In FIG. 10, an example is explained in which the base station eNB transmits, to user apparatuses UE, a control signal which is common to the user apparatuses UE so as to set a RG pattern for the user apparatuses UE. The number of the RG pattern(s) designated by the control signal is not limited to one, and a plurality of RG patterns may be designated. For example, the base station eNB transmits, to the user apparatuses UE, a control signal designating RG pattern 1 and RG pattern N shown in FIG. 11.

Figure 16:
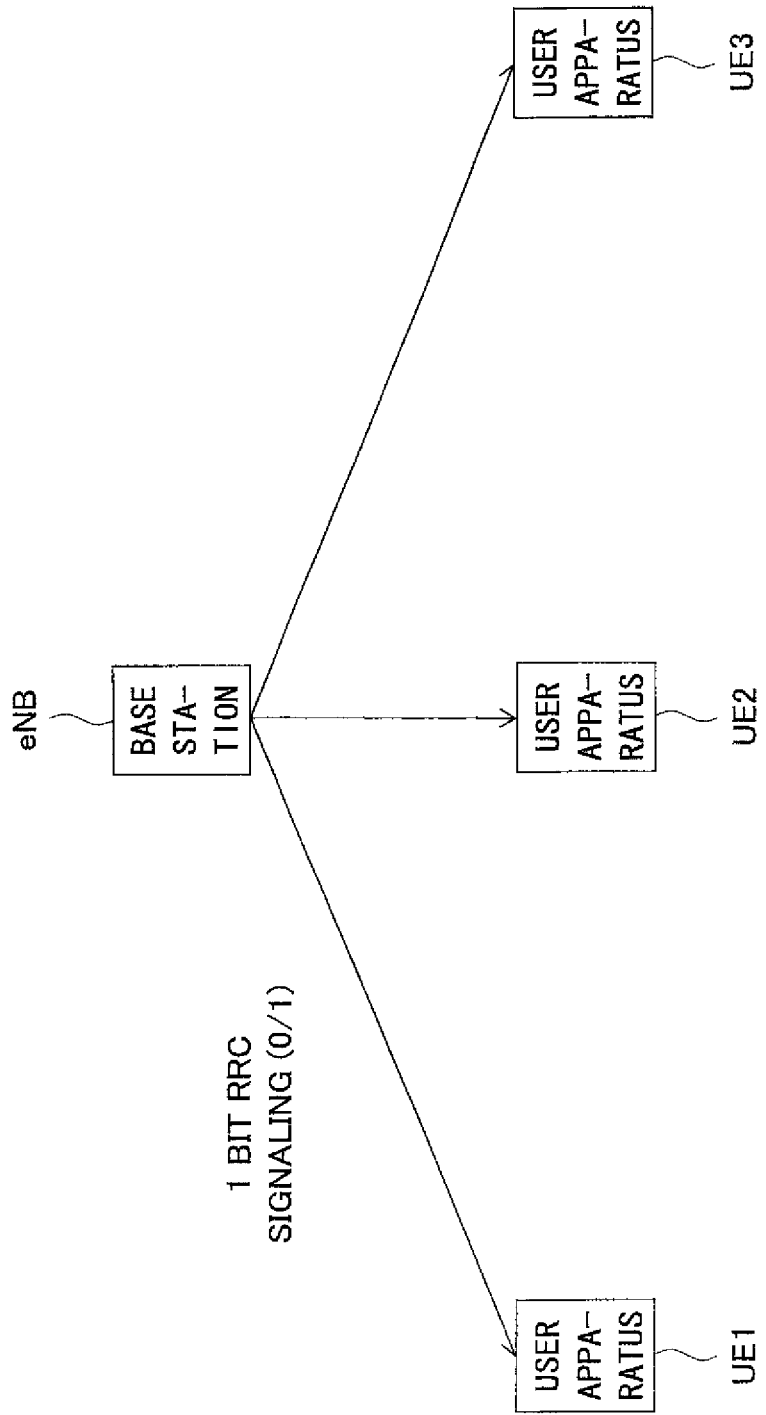
FIG. 16 is a diagram showing another example of signaling from the base station eNB to the user apparatus UE.
Figure 17:
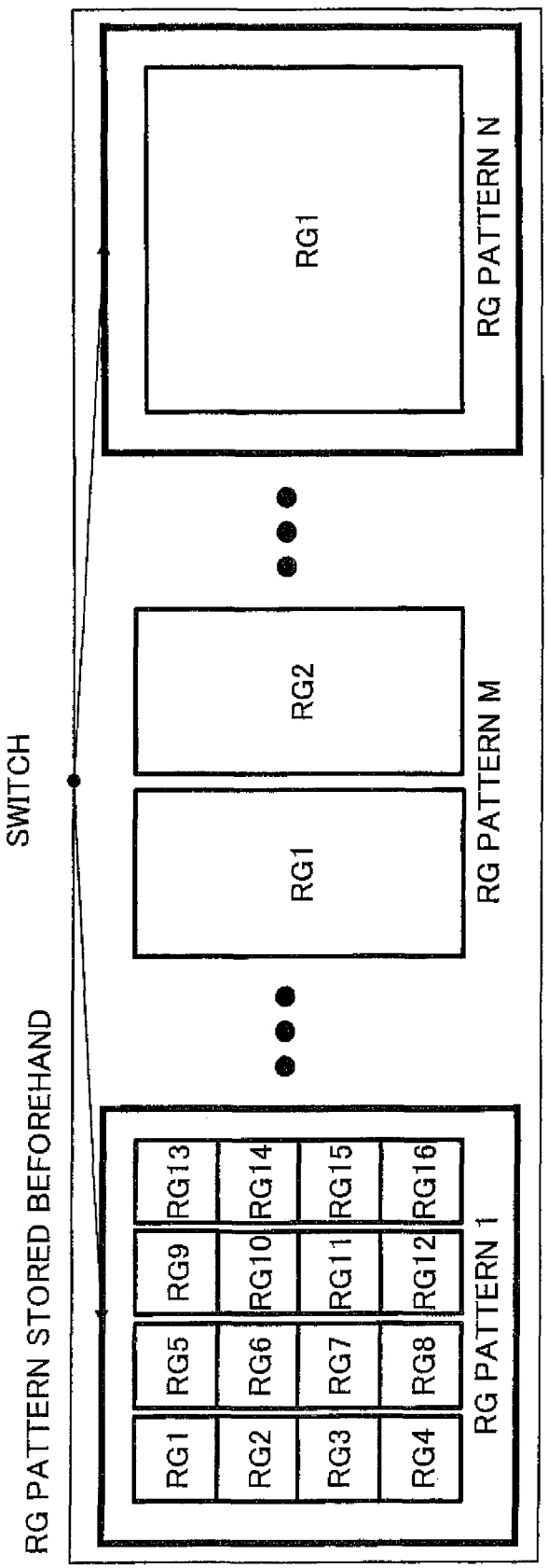
FIG. 17 is a diagram for explaining operation for switching between a plurality of RG patterns in the user apparatus UE.

In the case where a plurality of RG patterns are designated as mentioned above, the base station eNB designates, to the user apparatus UE, which RG pattern to use from among a plurality of RG patterns. The signaling for the designation can be realized by one bit RRC signaling (control signal) for 2RG patterns as shown in FIG. 16, for example. As shown in FIG. 17, when the user apparatus UE receives bit 0, for example, the user apparatus UE uses RG pattern 1 of the two RG patterns, and when the user apparatus receives bit 1, the user apparatus UE uses RG pattern N of the two RG patterns. By introducing a signaling shown in FIG. 16 for designating a plurality of RG patterns, it becomes possible to perform switching control quickly in which the base station eNB causes the user apparatus UE to use a RG pattern from among a plurality of RG patterns.

The above-mentioned example is an example in which the number of the RG patterns is two. But, the number of the RG patterns is not limited two, and it may be tree or more. In this case, for example, according to the number of the RG patterns, the number of bits is increased for the control signal to be transmitted in the signaling shown in FIG. 16.

Example 2-5: Example where User Apparatus GE is Out of Communication Range (Out of NW Coverage)

Figure 18:
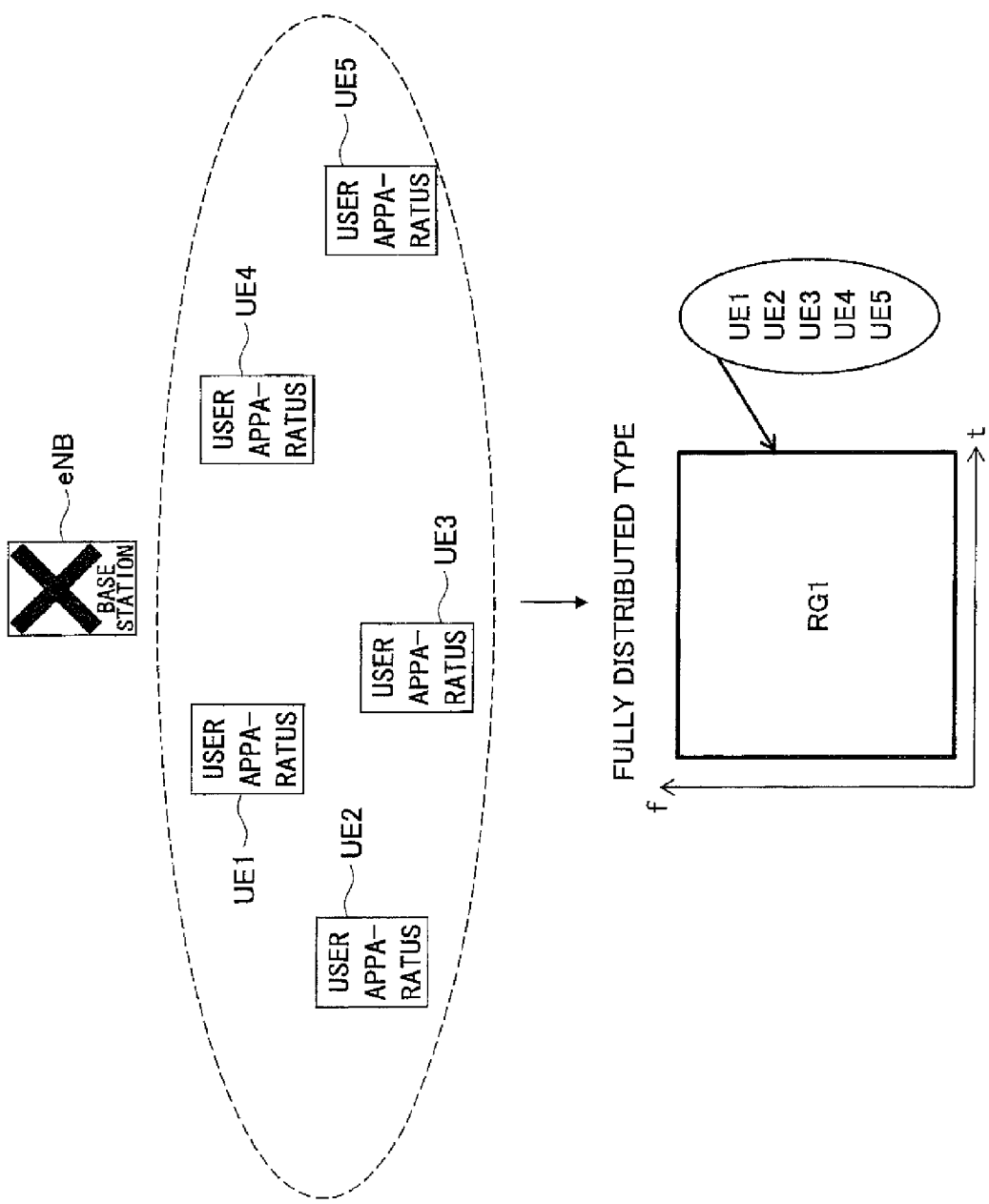
FIG. 18 is a diagram for explaining an operation example in a case where the user apparatus UE becomes out of a communication range.

There is a possibility in that a case may occur where a failure occurs in the base station eNB so that signaling from the base station eNB to the user apparatus UE is unavailable (example shown in FIG. 18), or, a case may occur where the user apparatus UE moves out of a communication range so that the user apparatus UE cannot receive the signaling from the base station eNB. When the user apparatus UE detects occurrence of such a situation by detecting unavailability of communication with the base station eNB, the user apparatus UE selects a RG pattern of the fully distributed type shown in FIG. 18, for example, as a RG pattern for use, so as to transmit a discovery signal by arbitrarily selecting a discovery resource.

Figure 24:
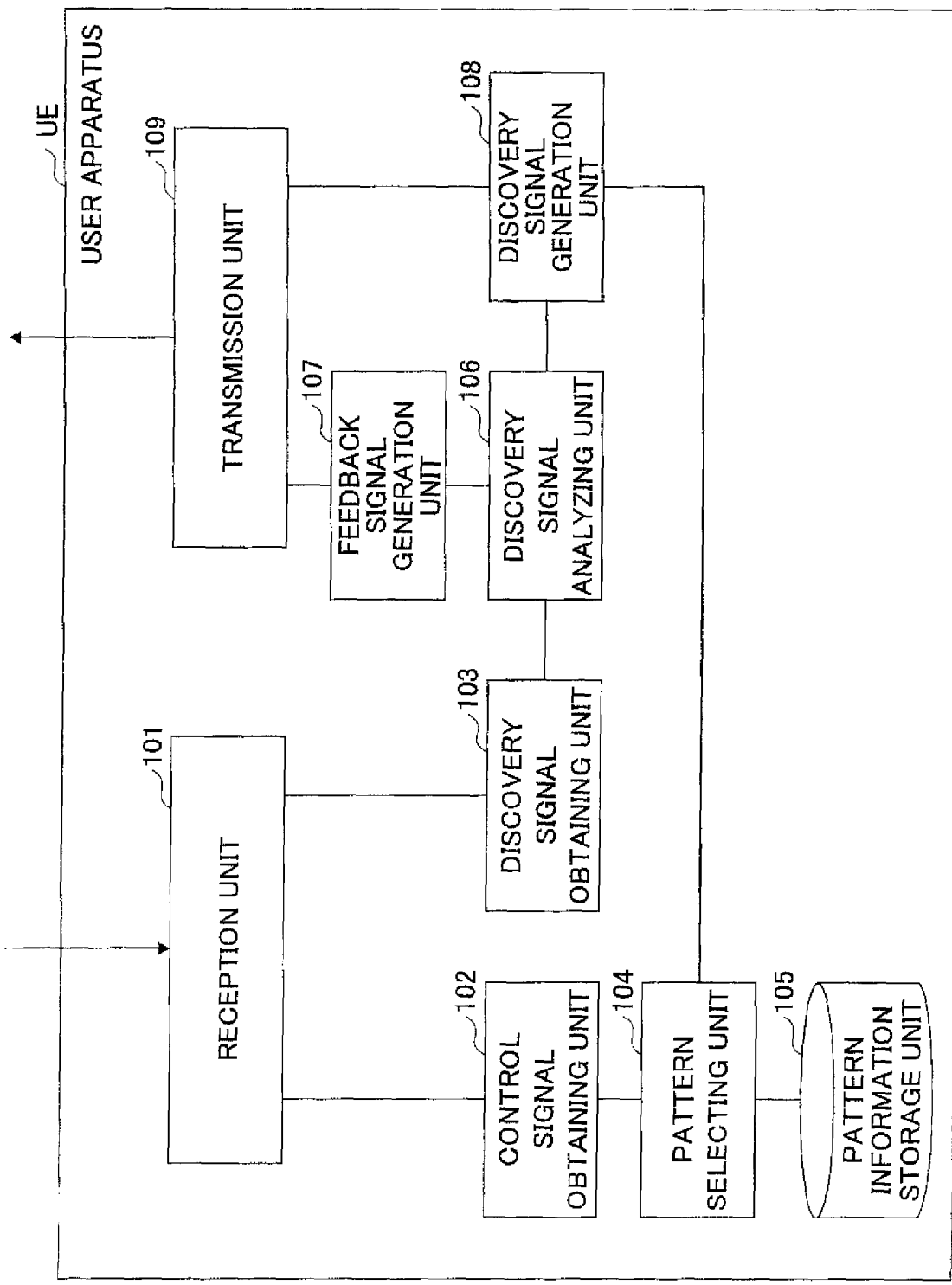
FIG. 24 is a functional block diagram of the user apparatus UE.

For example, as for the user apparatus UE shown in FIG. 24, when the user apparatus UE detects, by a reception unit 101, that the user apparatus UE is out of the communication range, a pattern selection unit 104 selects the RE pattern, and sends the RG pattern to a discovery signal generation unit 108, and the discovery signal generation unit 108 performs transmission of a discovery signal by arbitrarily selecting a discovery resource using the RG pattern.

Example 3: Signaling from the User Apparatus UE to the Base Station eNB

Next, an example of signaling from the user apparatus UE to the base station eNB is described.

Example 3-1: Transmission of Congestion Information

Figure 19:
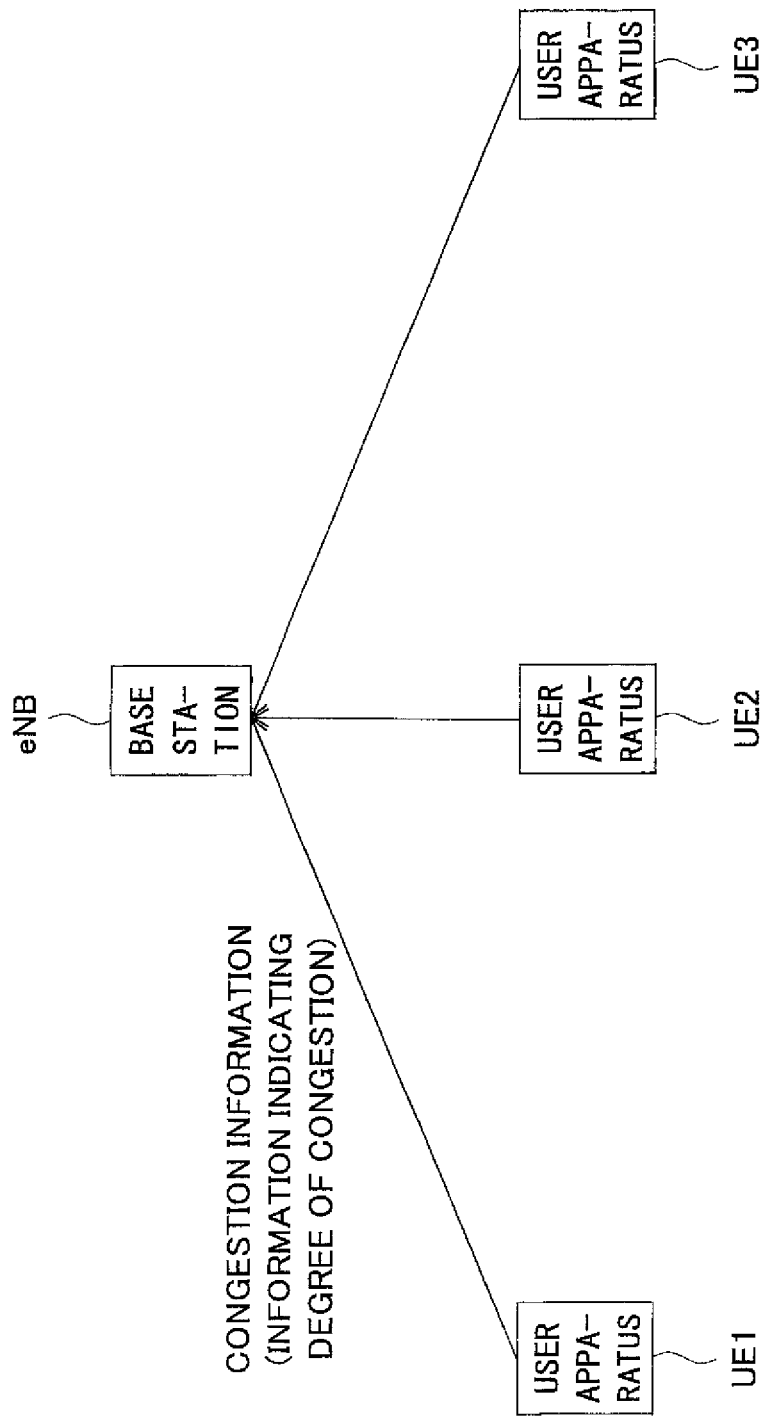
FIG. 19 is a diagram showing an example of signaling from the user apparatus UE to the base station eNB.

As shown in FIG. 19, in the present embodiment, each user apparatus UE performs signaling to transmit a control signal including information indicating congestion to the base station eNB. In the present embodiment, although a method for measuring congestion by the user apparatus UE is not limited to a particular method, for example, the status of congestion can be estimated by measuring the number of received discovery signals, frequency of collision of transmitted discovery signal with another discovery signal, and the like. The user apparatus UE transmits, to the base station eNB, information (congestion information) indicating congestion measured by the user apparatus UE by the signaling.

The signaling for transmitting congestion information to the base station eNB may be performed based on a predetermined trigger such as a trigger in which the degree of congestion becomes equal to or greater than a predetermined value, or may be performed at a constant time interval.

The base station eNB that receives congestion information from a user apparatus UE performs control of configuration change such as changing a hopping pattern or changing a RG pattern for the user apparatus UE. Such a control can be performed by transmitting the before-mentioned GE specific control signal to the user apparatus UE. Also, the base station eNB receives congestion information from a plurality of user apparatuses UE in the area, and broadcasts a UE common control signal so that configuration of the plurality of user apparatuses GE in the area can be changed uniformly.

Figure 20:
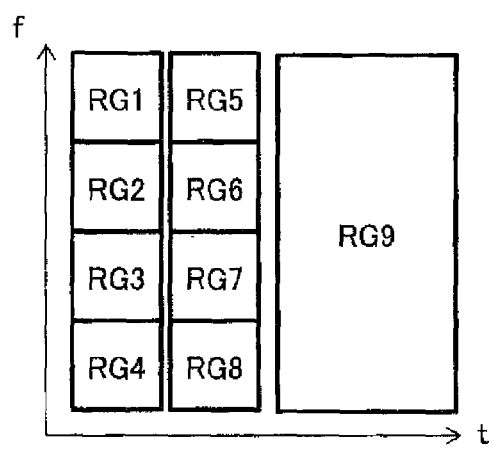
FIG. 20 is a diagram showing an example for performing configuration change for the user apparatus UE.

FIG. 20 is a diagram showing an example for performing configuration change for the user apparatus UE. In the Example shown in FIG. 20, the user apparatus UE is assigned a RG pattern including RG9 of the distributed type and RG1-RG8 of the centralized type. For example, the user apparatus UE is configured to use RG9 initially, so as to transmit a discovery signal while arbitrarily selecting a discovery resource in the RG9. Then, if the user apparatus UE transmits, to the base station eNB, congestion information indicating that the degree of congestion is high, the base station eNB transmits, to the user apparatus GE, by a control signal, a RG hopping pattern parameter to cause the user apparatus GE to use RG1-RG8 of the centralized type instead of using RG9 of the distributed type, in order to reduce the possibility of collision of discovery signals and the possibility of unavailability of discovery signal reception (deafness). The user apparatus UE performs transmission of a discovery signal by using a RG(=DR) from among RG1-RG8 according to the RG hopping pattern designated by the control signal. The RG hopping pattern is an optimum pattern that is dynamically selected in the base station eNB, for the user apparatus UE, for reducing the possibility of collision of discovery signals with other user apparatuses and unavailability of reception of discovery signal (deafness).

Figure 21:
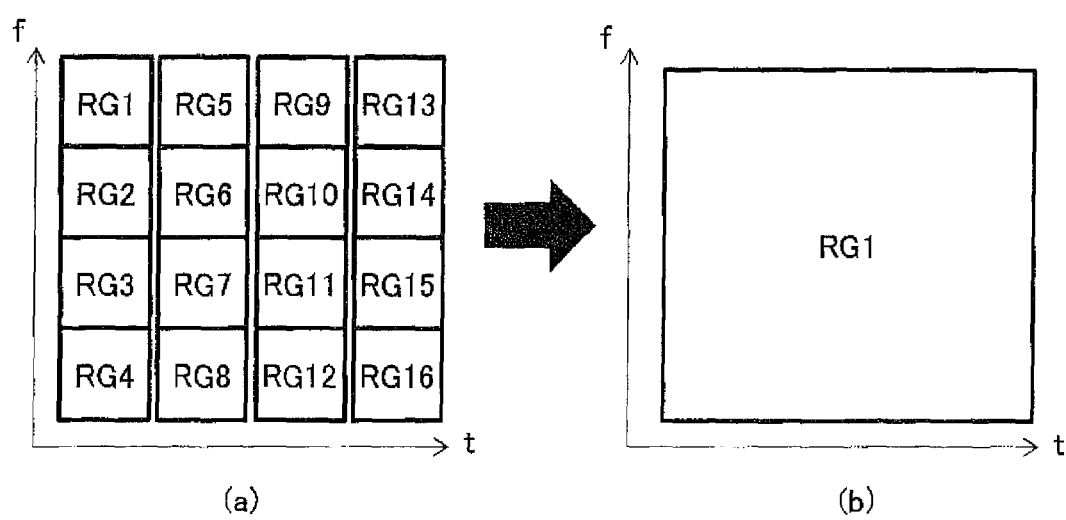
FIG. 21 is a diagram showing an example for performing configuration change for the user apparatus UE.

FIG. 21 is a diagram showing another example of performing configuration change for the user apparatus UE.

In the example shown in FIG. 21, the user apparatus UE is assigned a RG pattern of the fully centralized type shown in FIG. 21(a) initially, so that the user apparatus UE performs transmission of a discovery signal according to a RG or a RG hopping pattern designated from the base station eNB. Then, if the user apparatus UE transmits, to the base station eNB, congestion information indicating that the degree of congestion is low, the base station eNB determines that the possibility of collision of discovery signals and unavailability of discovery signal reception (deafness) is low, so the base station eNB transmits, to the user apparatus UE, a control signal to cause the user apparatus to use RG pattern of the fully distributed type instead of using RG pattern of fully centralized type. Then, the user apparatus UE performs transmission of a discovery signal using a RG pattern of the fully distributed type designated by the control signal.

Example 3-2: Signaling for Notifying of Discovered UE

In the present embodiment, the use apparatus UE can transmit, to the base station eNB, by a control signal, identification information (ID) of a user apparatus UE discovered by itself. In the present embodiment, the user apparatus UE may transmit all IDs of discovered user apparatuses UE, or may transmit IDs of first discovered N user apparatuses UE by defining a predetermined number N (N is a natural number). The term "discovery" here may be "discovery" in one discovery period, or may be "discovery" in a predetermined duration including a plurality of discovery periods.

The transmission of the control signal (signaling execution) by the user apparatus UE may be performed in response to receiving a predetermined RRC signal from the base station eNB, for example, or may be performed based on occurrence of a predetermined event as a trigger like transmission of a measurement report. The predetermined event can be considered to be, for example, a case where the degree of congestion becomes higher than a threshold.

A configuration change example for a user apparatus UE by a base station eNB that receives the above-mentioned control signal is described with reference to FIGS. 22 and 23.

Figure 22:
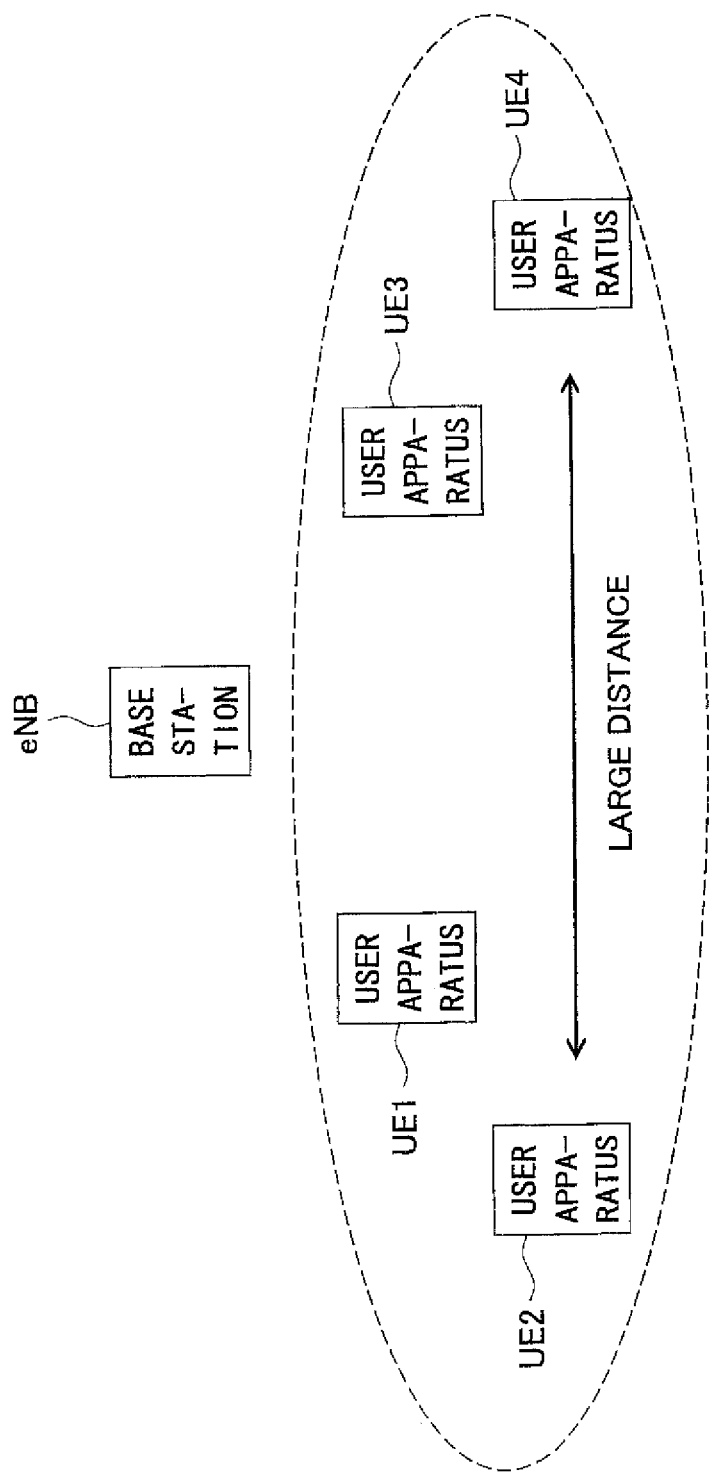
FIG. 22 is a diagram showing an example for performing configuration change for the user apparatus UE.

In this example, as shown in FIG. 22, it is assumed that the distance between the group of the user apparatuses UE1 and UE2 and the group of the user apparatuses UE3 and UE4 is large.

A RG pattern and a RG are assigned to each user apparatus UE as shown in FIG. 23(a). That is, RG1 is assigned to user apparatuses UE1 and UE2 which are separated by a small distance, and RG2 is assigned to user apparatuses UE3 and UE4 which are separated by a small distance. In the RG1, since a discovery resource DR is arbitrarily selected by each user apparatus UE, there is a possibility of occurrence of collision of discovery signals between user apparatuses UE and occurrence of unavailability of discovery signal reception (deafness).

Here, the user apparatus UE1 discovers the user apparatus UE2, and transmits, to the base station eNB, information (ID of user apparatus UE2) indicating that the user apparatus UE2 is discovered by using the above-mentioned signaling. Also, the user apparatus UE3 discovers the user apparatus UE4, and transmits, to the base station eNB, information (ID of user apparatus UE4) indicating that the user apparatus UE4 is discovered by using the above-mentioned signaling.

The base station eNB that receives the information determines that the distance between the user apparatuses UE1 and UE2 is short (to an extent that transmission and reception of a discovery signal can be performed), the distance between the user apparatuses UE3 and UE4 is short, and that the distance between user apparatuses UE1 and UE2, and user apparatuses UE3 and UE4 is long (longer than a distance over which a discovery signal arrives), so that the base station eNB changes assignment of RG as shown in FIG. 23(b) and transmits a control signal for the changed assignment to each user apparatus.

As shown in FIG. 23(b), after the assignment of RG is changed, different RGs are assigned to the user apparatuses UE1 and UE2 of the short distance. Thus, the possibility of collision is eliminated. This also applies to UE3 and UE4. On the other hand, since the distance between the user apparatuses UE1 and UE3 to which the same RG1 is assigned is large, the possibility of collision is low. This also applies to UE2 and UE4.

Figure 23:
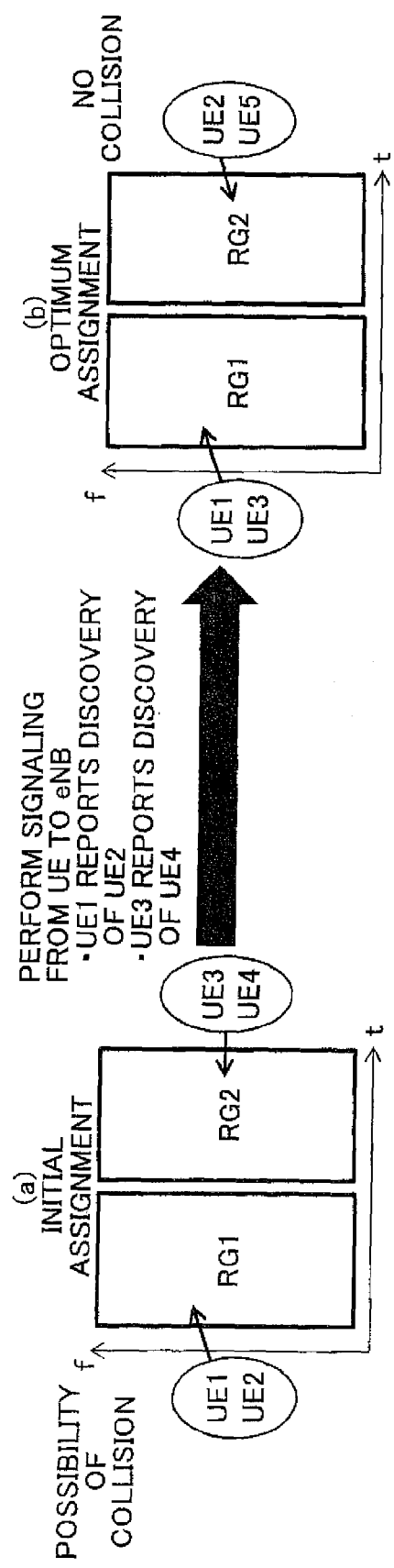
FIG. 23 is a diagram showing an example for performing configuration change for the user apparatus UE.

Although the example shown in FIG. 22 and FIG. 23 is an example in which a small number of UEs exist, similar control can be performed for many UEs. In the control for many UEs, RG assignment can be incrementally optimized over time.

(Apparatus Configuration Example)

In the following, configuration examples and operation examples are described for the user apparatus UE and the base station eNB that are able to execute process operations including process operations of the basic example, the example 1, the example 2 and the example 3 described so far.

<Configuration Example of User Apparatus UE>

FIG. 24 shows a functional configuration example of the user apparatus UE in the present embodiment. As shown in FIG. 24, the user apparatus UE includes a reception unit 101, a control signal obtaining unit 102, a discovery signal obtaining unit 103, a pattern selecting unit 104, a pattern information storage unit 105, a discovery signal analyzing unit 106, a feedback signal generation unit 107, a discovery signal generation unit 108 and a signal transmission unit 109. Function outline of each function unit is as follows.

The reception unit 101 receives a signal, by radio, from the base station eNB or from another user apparatus UE. The control signal obtaining unit 102 obtains information (example: RRC signaling information) of a control signal from a signal received by the reception unit 101. The discovery signal obtaining unit 103 obtains information of a discovery signal from a received signal.

In the example shown in FIG. 24, predefined RG patterns and hopping patterns (RG hopping patterns and DR hopping patterns) are associated with indexes (identification information) and are stored in the pattern information storage unit 105. The pattern selecting unit 104 obtains, from the pattern information storage unit 105, a RG pattern and/or a hopping pattern corresponding to an index included in the control signal, and reports the RG pattern and/or the hopping pattern to the discovery signal generation unit 108. The discovery signal generation unit 108 determines a RG based on the reported RG pattern and/or hopping pattern, selects a discovery resource from the RG and generates a discovery signal. The transmission unit 109 transmits the discovery signal using the selected discovery resource. The transmission unit 109 also transmits other signals.

The discovery signal analyzing unit 106 generates feedback information (congestion information, discovered UE information in example 3 and the like) to be included in a feedback signal based on the number of received discovery signals and collision status, for example. The feedback signal generation unit 107 generates the feedback signal including the feedback information generated by the discovery signal analyzing unit 106.

In a case where the user apparatus UE receives a RG pattern and/or a hopping pattern itself from the base station eNB, it is not essential to provide the pattern information storage unit 105. The discovery signal generation unit 108 can select a discovery resource according to the RG pattern and/or the hopping pattern received from the base station eNB.

In a case where the RG pattern and/or the hopping pattern is stored in the pattern information storage unit 105, the format for the stored information is not limited to a particular format. For example, as the RG pattern, information can be stored in which resource positions of discovery resources in the discovery resource whole region are associated with resource group identification information. As the hopping pattern, information of the format shown in FIGS. 13-15 can be stored while being associated with RG pattern.

As mentioned above, the user apparatus UE includes a functional unit (example: pattern selecting unit 104 and discovery signal generation unit 108) configured to determine a RG pattern to be used by the user apparatus UE based on information transmitted from a base station eNB, and determines a RG including one discovery resource or a plurality of discovery resources that can be used for transmitting the discovery signal from among one RG or a plurality of RGs included in the RG pattern; and functional unit (example: discovery signal generation unit 108) configured to select a discovery resource to be used for transmitting the discovery signal from among the determined RG.

The discovery signal generation unit 108 determines the RG based on information indicating a hopping pattern of RG transmitted from the base station eNB. Also, the discovery signal generation unit 108 can select the discovery resource based on information of a hopping pattern of a discovery resource transmitted from the base station eNB.

Figure 25:
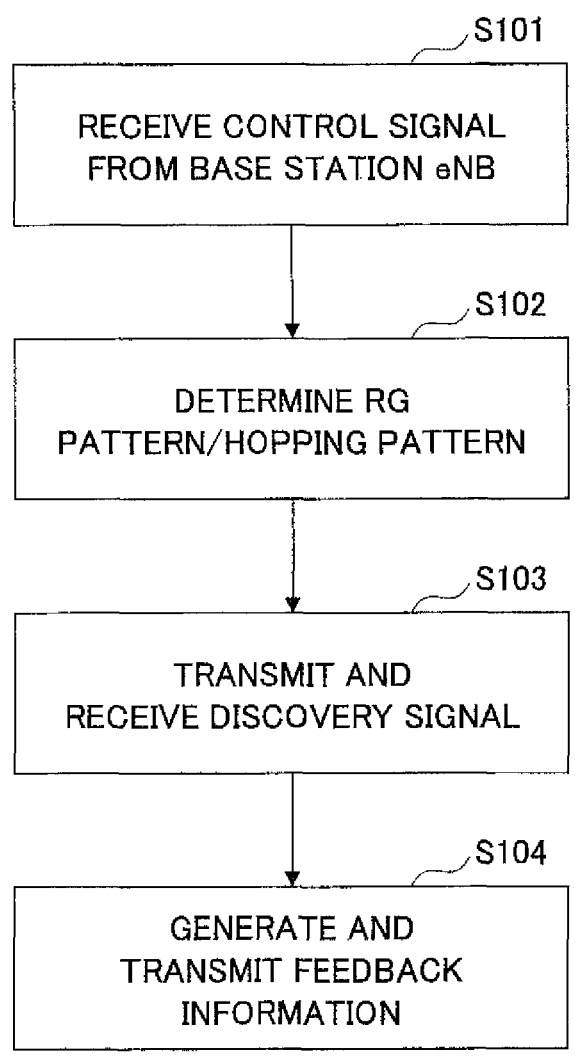
FIG. 25 is a flowchart showing an operation procedure example of the user apparatus UE.

FIG. 25 is a flowchart showing an operation procedure example of the user apparatus UE. An operation example of the user apparatus UE shown in FIG. 24 is described with reference to FIG. 25. In this operation example, as described in the example 2-1, it is assumed that the user apparatus UE receives a control signal from the base station eNB, the pattern selecting unit 104 of the user apparatus UE determines a RG pattern for use, and reports the RG pattern and the like to the discovery signal generation unit 108, and the discovery signal generation unit 108 already performs generation and transmission based on the RG pattern and the like.

In step 101 of FIG. 25, the reception unit 101 of the user apparatus UE receives a control signal that is generated based on feedback information and the like by the base station eNB, and the control signal obtaining unit 102 obtains information of the control signal. The control signal is, for example, a control signal of signaling from the base station eNB described in the example 2-2. Next, the pattern selecting unit 104 obtains a RG pattern and/or hopping pattern from the pattern information storage unit 105 based on information of the control signal obtained by the control signal obtaining unit 102, and reports the RG pattern and/or hopping pattern to the discovery signal generation unit 108 (step 102). By this notification, the discovery signal generation unit 108 is configured to use the RG pattern and/or hopping pattern. Also, the period and the duration described in the example 2-2 may be reported to the discovery signal generation unit 108 from the pattern selecting unit 104 to configure them.

The discovery signal generation unit 108 performs section of a discovery resource and generation of a discovery signal according to the pattern and the like reported in step 102, and transmits the discovery signal from the transmission unit 109 (step 103). Transmission here is performed as shown in FIG. 12, for example. Also, in step 103, reception of a discovery signal is performed, so that the discovery signal obtaining unit 103 obtains information of the discovery signal.

The discovery signal analyzing unit 106 generates feedback information (congestion information, discovered UE information in example 3 and the like) to be included in a feedback signal based on UE information included in the discovery signal, the number of received discovery signals, collision status and the like, for example. The feedback signal generation unit 107 generates a feedback signal including the information generated by the discovery signal analyzing unit 106, so as to transmit the feedback signal to the base station eNB using the transmission unit 109 (step 104).

Figure 26:
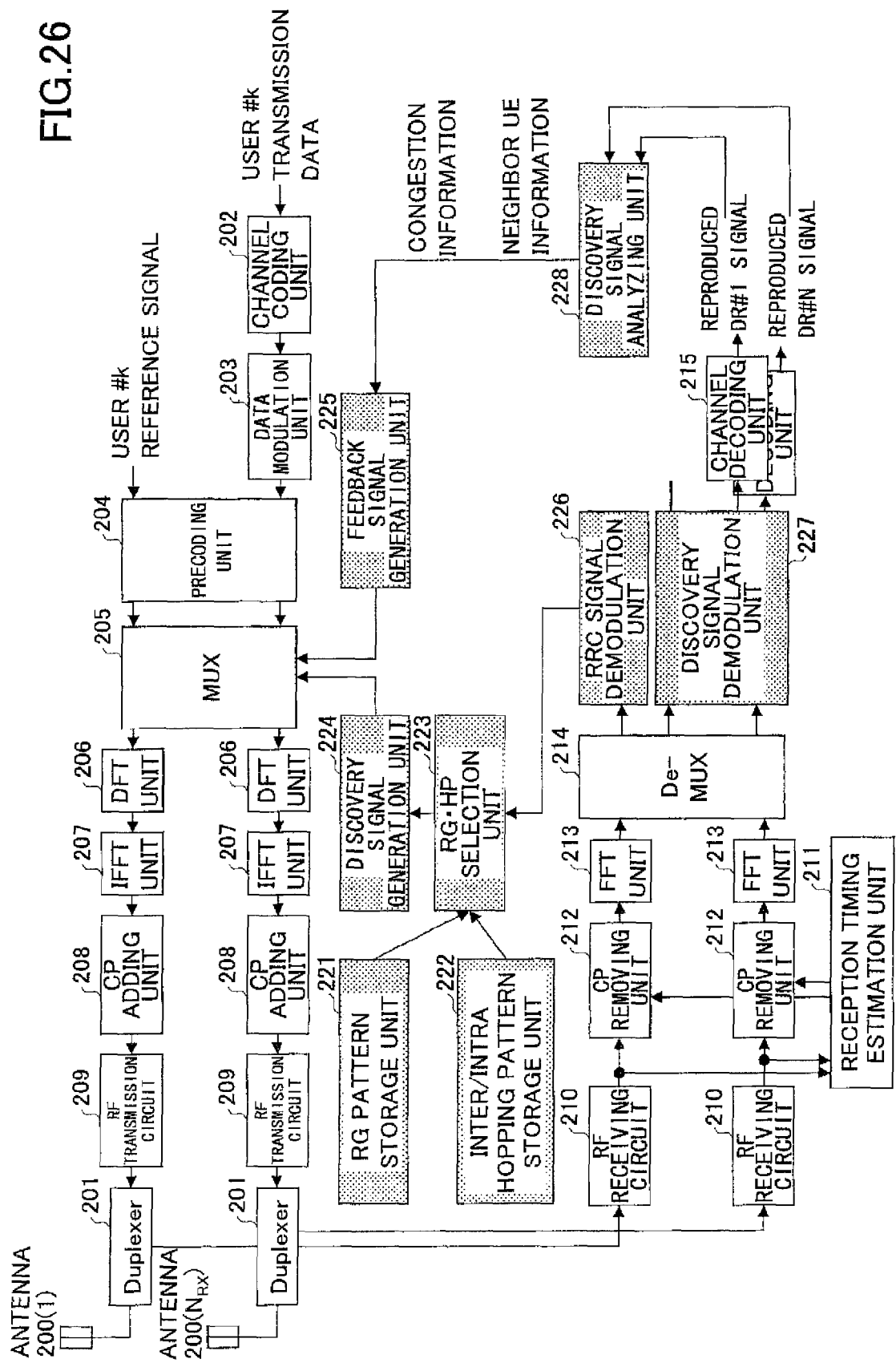
FIG. 26 is a diagram showing a concrete configuration example of the user apparatus UE.

FIG. 26 shows a more concrete functional configuration example of the user apparatus UE in the present embodiment. However, a concrete example of the configuration shown in FIG. 24 is not limited to the configuration shown in FIG. 26. In the configuration shown in FIG. 26, hatched functional units are functional units related to an embodiment of the present invention. The configuration of other functional units is also provided in an existing user apparatus UE.

As shown in FIG. 26, the uses apparatus UE includes, as a configuration common to transmission and reception, antennas 200 (1~$N_{Rx}$) and duplexers 201. By the way, although FIG. 26 shows a configuration supporting two antennas, this is for the sake of convenience of illustrations, and the number of antennas is not limited to two.

The user apparatus includes, as a configuration in the transmission side, a channel coding unit 202, a data modulation unit 203, a precoding unit 204, a MUX (multiplexing unit) 205. a DFT unit 206, an IFFT unit 207, a CP adding unit 208, an RF transmission circuit 209. In addition, as a configuration of the receiving side, the user apparatus UE includes an RF receiving circuit 210, a reception timing estimation unit 211, a CP removing unit 212, an FFT unit 213, a De-MUX (demultiplexing unit) 214, a channel decoding unit 215. Although the configuration example shown in FIG. 26 is a configuration example in which the configuration for performing signal transmission and reception with the base station eNB and the configuration for performing signal transmission and reception with other user apparatuses are common, the user apparatus UE may be configured to include the configuration (configuration for performing D2D communication) for performing signal transmission and reception with other user apparatuses in addition to the configuration for performing signal transmission and reception with the base station eNB.

As shown by hatching, as functional units related to the present embodiment, the user apparatus UE includes a RG pattern storage unit 221, an inter/intra hopping pattern storage unit 222, a RG•HP selection unit 223, a discovery signal generation unit 224, a feedback signal generation unit 225, an RRC signal demodulation unit 226, a discovery signal demodulation unit 227, and a discovery signal analyzing unit 228. The inter-hopping is a hopping between RGs, and the intra-hopping is a hopping between DRs within a RG.

The RG pattern storage unit 221 and the inter/intra hopping pattern storage unit 222 correspond to the pattern information storage unit 105 in the configuration shown in FIG. 24. The RG. HP selection unit 223 corresponds to the pattern selecting unit 104 in the configuration shown in FIG. 24. The discovery signal generation unit 224, the feedback signal generation unit 225, the discovery signal analyzing unit 228 correspond to the discovery signal generation unit 108, the feedback signal generation unit 225, and the discovery signal analyzing unit 106 respectively. The RRC signal demodulation unit 226 corresponds to the control signal obtaining unit 102 in the configuration shown in FIG. 24. The discovery signal demodulation unit 227 and the channel decoding unit 215 correspond to the discovery signal obtaining unit 103 in the configuration shown in FIG. 24. Operation of these functional units is similar to operation of corresponding functional units described with reference to FIG. 24 and FIG. 25.

<Configuration Example of Base Station eNB>

Figure 27:
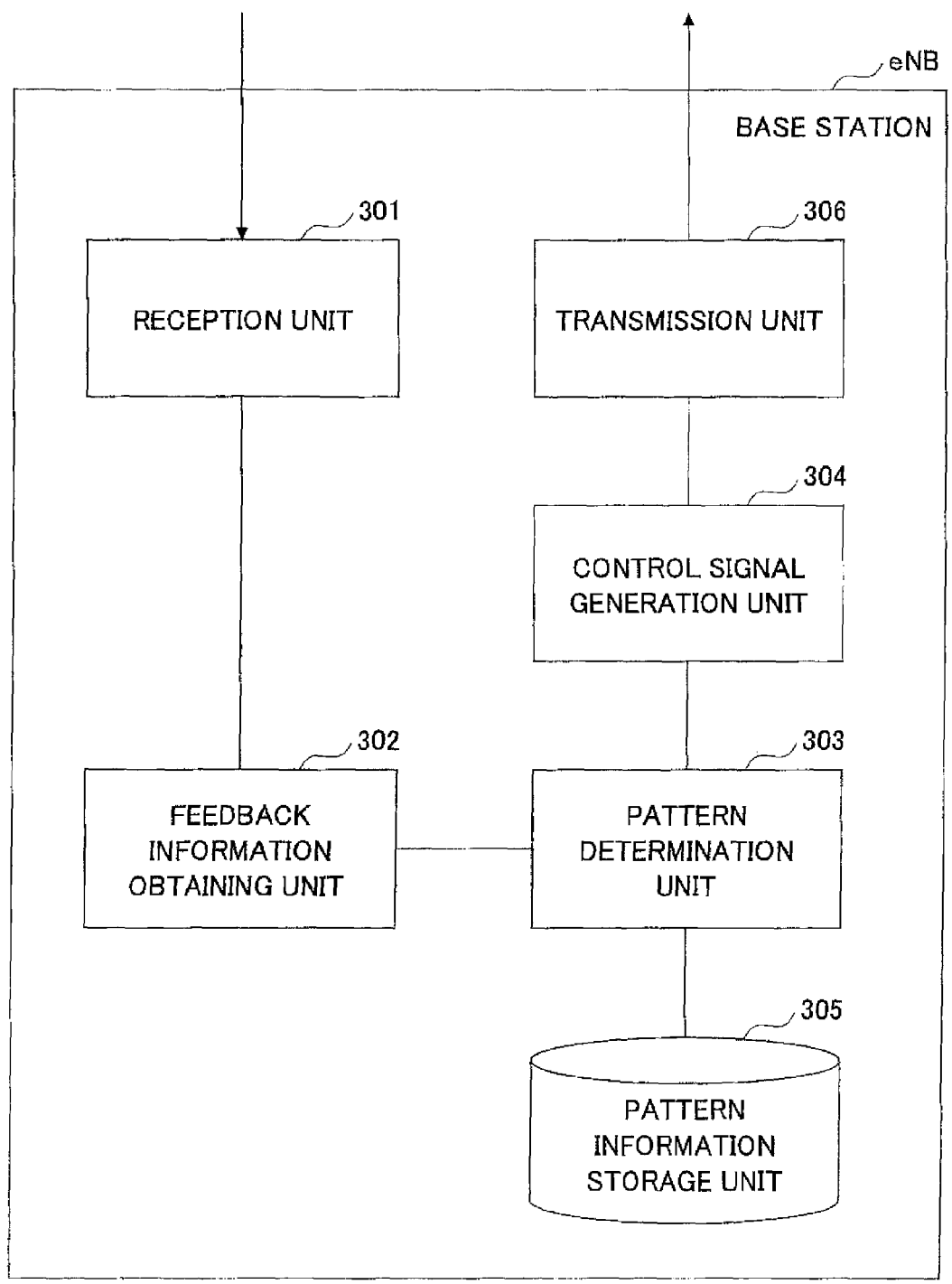
FIG. 27 is a functional block diagram of the base station eNB.

FIG. 27 shows a functional configuration example of the base station eNB in the present embodiment. As shown in FIG. 27, the base station eNB includes a reception unit 301, a feedback information obtaining unit 302, a pattern determination unit 303, a control signal generation unit 304, a pattern information storage unit 305, and a transmission unit 306. Outline of each functional unit is as follows.

The reception unit 301 receives a signal transmitted from the user apparatus UE by radio. The feedback information obtaining unit 302 obtains feedback information (congestion information, discovered UF information in example 3 and the like) from a signal received from the user apparatus UE. For example, as described in the example 3, the pattern determination unit 303 determines RG pattern and/or hopping pattern based on the feedback information, and passes the index to the control signal generation unit 304. Instead of passing the index, the pattern itself may be passed to the control signal generation unit 304. In such a case, the determined pattern is read out from the pattern information storage unit 305, and passes it to the control signal generation unit 304. The control signal generation unit 304 generates a control signal including the information passed from the pattern determination unit 303. The transmission unit 306 transmits the control signal and user data to the user apparatus UE by radio.

That is, the base station includes a functional unit (example: the pattern determination unit 303, the control signal generation unit 304 and the transmission unit 306) configured to transmit a control signal including information of a RG pattern to the user apparatus UE, and a functional unit (example: the pattern determination unit 303, the control signal generation unit 304 and the transmission unit 306) configured to transmit, to the user apparatus UE, information to be used for determining a RG including one or more discovery resources used for transmitting a discovery signal from among one or more RGs included in the RG pattern.

Figure 28:
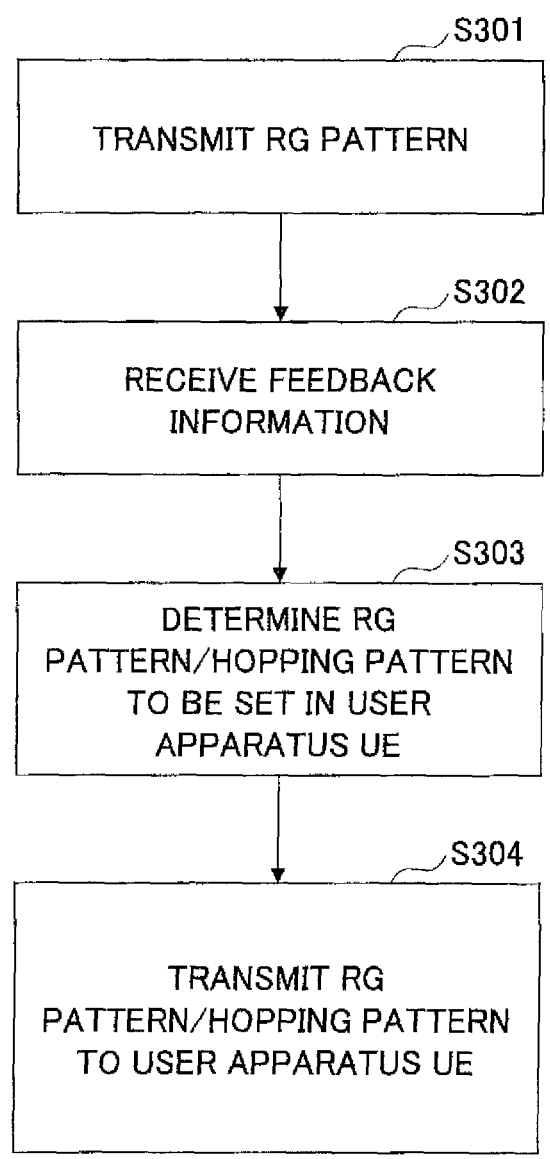
FIG. 28 is a flowchart showing an operation procedure example of the base station eNB.

FIG. 28 is a flowchart showing an operation procedure example of the base station eNB. An operation example of the base station eNB is described with reference to FIG. 28.

In this example, first, the control signal generation unit 304 of the base station eNB generates a control signal including information (index or RG pattern itself) of a RG pattern. Then, the transmission unit 306 transmits the control signal by broadcasting (step 301). The transmission of the control signal corresponds to the signaling described in the example 2-1. The RG pattern in step 301 is determined by the pattern determination unit 303 and the like based on the signal received from each user apparatus UE in a cell of the base station eNB, for example. Also, information transmitted here is not limited to a RG pattern. A hopping pattern, a period, a duration and the like may be transmitted in addition to the RG pattern.

Next, the base station eNB receives a signal including feedback information from the user apparatus UE, and the feedback information obtaining unit 302 obtains feedback information from the signal (step 302). The feedback information here is, for example, congestion information, discovered UE information described in the example 3 and the like.

As described in the example 3, for example, the pattern determination unit 303 of the base station eNB determines a RG pattern and/or hopping pattern based on the feedback information, and passes the index or the pattern itself to the control signal generation unit 304 (step 303). Then, the control signal generation unit 304 generates a control signal including information of the pattern determined in step 303, and the transmission unit 306 transmits the control signal (step 304). The control signal corresponds to the control signal described in the example 2-2, for example. The control signal transmitted in step 304 may include information of period and duration in addition to the information of RG pattern and/or hopping pattern.

Figure 29:
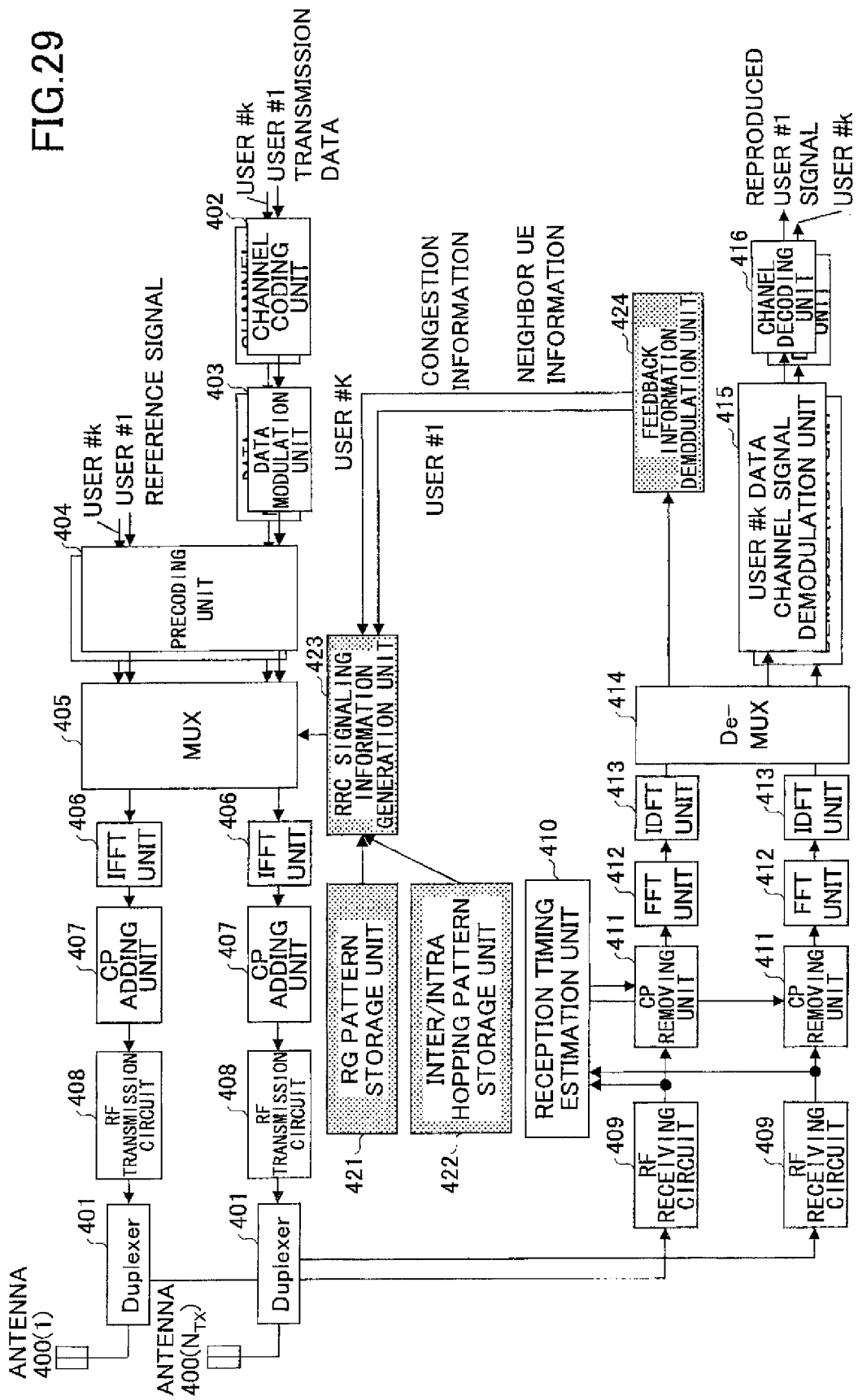
FIG. 29 is a diagram showing a concrete configuration example of the base station eNB.

FIG. 29 shows a more concrete functional configuration example of the base station eNB in the present embodiment. However, a concrete example of the configuration shown in FIG. 27 is not limited to the configuration shown in FIG. 29.

In the configuration shown in FIG. 29, hatched functional units are functional units related to an embodiment of the present invention. The configuration of other functional units is also provided in an existing base station eNB.

As shown in FIG. 29, the base station eNB includes, as a configuration common to transmission and reception, antennas 400 ($1 \sim N_{TX}$) and duplexers 401. By the way, although FIG. 29 shows a configuration supporting two antennas, this is for the sake of convenience of illustrations, and the number of antennas is not limited to two.

Also, the base station eNB includes, as a configuration of the transmission side, a channel coding unit 402, a data modulation unit 403, a preceding unit 404, a MUX (multiplexing unit) 405, an IFFT unit 406, a CP adding unit 407, and an RF transmission circuit 408. In addition, as a configuration in the receiving side, the base station eNB includes an RF receiving circuit 409, a reception timing estimation unit 410, a CP removing unit 411, an FFT unit 412, an IDFT unit 413, a De-MUX (demultiplexing unit) 414, a user data channel signal demodulation unit 415, and a channel decoding unit 416.

As shown by hatching, as functional units related to the present embodiment, the base station eNB includes a RG pattern storage unit 421, an inter/intra hopping pattern storage unit 422, an RRC signaling information generation unit 423, and a feedback information demodulation unit 424.

The RG pattern storage unit 421 and the inter/intra hopping pattern storage unit 422 correspond to the pattern information storage unit 305 in the configuration of FIG. 27. The RRC signaling information generation unit 423 corresponds to the pattern determination unit 303 and the control signal generation unit 304 of FIG. 27. The feedback information demodulation unit 424 corresponds to the feedback information obtaining unit 302 in the configuration of FIG. 27. Operation of these functional units is similar to operation of corresponding functional units described with reference to FIG. 27 and FIG. 28.

As described above, according to the present embodiment, in terminal-to-terminal communication, it becomes possible to perform selection of a discovery resource by a scheme in which the centralized type and the distributed type coexist. Also, according to the present embodiment, a new integrated discovery resource selection scheme that functions in any of the centralized type, the distributed type and both of them is realized. According to this scheme, for example, as shown in the example 3, resource control is realized for flexible and effective discovery signal transmission in which characteristics of both of the centralized type and the distributed type are utilized.

In the above, the present invention has been explained while referring to the specific embodiments. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the base station eNB have been explained by using functional block diagrams. However, each apparatus may be implemented in hardware, software, or a combination thereof. The software that operates according to the present invention (software executed by a processor provided in the user apparatus UE, software executed by a processor provided in the base station eNB) may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2013-097184, filed in the JPO on May 2, 2013, and the entire contents of the Japanese patent application No. 2013-097184 are incorporated herein by reference.

DESCRIPTION OF REFERENCE SIGNS

UE user apparatus
101 reception unit
102 control signal obtaining unit
103 discovery signal obtaining unit
104 pattern selecting unit
105 pattern information storage unit
106 discovery signal analyzing unit
107 feedback signal generation unit
108 discovery signal generation unit
109 signal transmission unit
200 antenna
201 duplexer
202 channel coding unit
203 data modulation unit
204 precoding unit
205 MUX (multiplexing unit)
206 DFT unit
207 IFFT unit
208 CP adding unit
209 RF transmission circuit
210 RF receiving circuit
211 reception timing estimation unit
212 CP removing unit
213 FFT unit
214 De-MUX (demultiplexing unit)
215 channel decoding unit
221 RG pattern storage unit
222 inter/intra hopping pattern storage unit
223 RG•HP selection unit
224 discovery signal generation unit
225 feedback signal generation unit
226 RRC signal demodulation unit
227 discovery signal demodulation unit
228 discovery signal analyzing unit
301 reception unit
302 feedback information obtaining unit
303 pattern determination unit
304 control signal generation unit
305 pattern information storage unit 306 transmission unit
400 antenna 400
401 duplexer
402 channel coding unit
403 data modulation unit
404 preceding unit
405 MUX (multiplexing unit)
406 IFFT unit
407 CP adding unit
408 RF transmission circuit
409 RE receiving circuit
410 reception timing estimation unit
411 CP removing unit
412 FFT unit
413 IDFT unit
414 De-MUX (demultiplexing unit)
415 user data channel signal demodulation unit
416 channel decoding unit
421 RG pattern storage unit
422 inter/intra hopping pattern storage unit
423 RRC signaling information generation unit
424 feedback information demodulation unit

The invention claimed is:

1. A user apparatus configured to perform transmission of a discovery signal by radio, comprising:
a processor and a memory, wherein the processor:
determines a resource group pattern that includes one or more resource groups for transmitting the discovery signal, to be used by the user apparatus based on information transmitted from a base station;
determines one of the resource groups including one discovery resource or a plurality of discovery resources that can be used for transmitting the discovery signal from among the one or more resource groups; and
selects a discovery resource to be used for transmitting the discovery signal from among the determined resource group.

2. The user apparatus as claimed in claim 1, wherein the processor determines the resource group based on information indicating a hopping pattern of a resource group transmitted from the base station.

3. The user apparatus as claimed in claim 2, wherein the processor selects the discovery resource based on information of a hopping pattern of a discovery resource transmitted from the base station.

4. The user apparatus as claimed in claim 2, wherein, the user apparatus generates feedback information based on a discovery signal received from another user apparatus, and transmits the feedback information to the base station.

5. The user apparatus as claimed in claim 1, wherein the processor selects the discovery resource based on information of a hopping pattern of a discovery resource transmitted from the base station.

6. The user apparatus as claimed in claim 5, wherein the user apparatus generates feedback information based on a discovery signal received from another user apparatus, and transmits the feedback information to the base station.

7. The user apparatus as claimed in claim 1, wherein the user apparatus generates feedback information based on a discovery signal received from another user apparatus, and transmits the feedback information to the base station.

8. A base station configured to transmit a control signal to a user apparatus that performs transmission of a discovery signal by radio, comprising:
a processor and a memory, wherein the processor:
transmits, to the user apparatus, a control signal including information indicating a resource group pattern that includes one or more resource groups for transmitting the discovery signal; and
transmits, to the user apparatus, information to be used for determining one of the resource groups that includes one discovery resource or a plurality of discovery resources that can be used for transmitting the discovery signal from among the one or more resource groups.

9. The base station as claimed in claim 8, wherein the information to be used for determining the resource group is information indicating a hopping pattern of a resource group.

10. The base station as claimed in claim 9, wherein the base station transmits, to the user apparatus, information indicating a hopping pattern used by the user apparatus to select a discovery resource for transmitting the discovery signal from among the resource group.

11. The base station as claimed in claim 9, wherein the base station receives, from the user apparatus, feedback information generated by the user apparatus based on a discovery signal received from another user apparatus, assigns a resource group pattern or a hopping pattern to the user apparatus based on the feedback information, and transmits, to the user apparatus, information indicating the resource group pattern or information indicating the hopping pattern.

12. The base station as claimed in claim 8, wherein the base station transmits, to the user apparatus, information indicating a hopping pattern used by the user apparatus to select a discovery resource for transmitting the discovery signal from among the resource group.

13. The base station as claimed in claim 12, wherein the base station receives, from the user apparatus, feedback information generated by the user apparatus based on a discovery signal received from another user apparatus, assigns a resource group pattern or a hopping pattern to the user apparatus based on the feedback information, and transmits, to the user apparatus, information indicating the resource group pattern or information indicating the hopping pattern.

14. The base station as claimed in claim 8, wherein the base station receives, from the user apparatus, feedback information generated by the user apparatus based on a discovery signal received from another user apparatus, assigns a resource group pattern or a hopping pattern to the user apparatus based on the feedback information, and transmits, to the user apparatus, information indicating the resource group pattern or information indicating the hopping pattern.

15. A discovery resource selection method executed by a user apparatus configured to perform transmission of a discovery signal by radio, comprising:
determining a resource group pattern that includes one or more resource groups for transmitting the discovery signal, to be used by the user apparatus based on information transmitted from a base station;
determining one of the resource groups including one discovery resource or a plurality of discovery resources that can be used for transmitting the discovery signal from among the one or more resource groups; and
selecting a discovery resource to be used for transmitting the discovery signal from among the determined resource group.

* * * * *